(12) United States Patent
Subasingha et al.

(10) Patent No.: US 11,726,186 B2
(45) Date of Patent: Aug. 15, 2023

(54) PIXEL FILTERING USING MULTIPLE EXPOSURES

(71) Applicant: Zoox, Inc., Foster City, CA (US)

(72) Inventors: Subasingha Shaminda Subasingha, Weston, FL (US); Turhan Karadeniz, Oakland, CA (US); Denis Nikitin, Campbell, CA (US); Harrison Thomas Waschura, Los Altos Hills, CA (US)

(73) Assignee: Zoox, Inc., Foster City, CA (US)

( * ) Notice: Subject to any disclaimer, the term of this patent is extended or adjusted under 35 U.S.C. 154(b) by 760 days.

(21) Appl. No.: 16/588,267

(22) Filed: Sep. 30, 2019

(65) Prior Publication Data

US 2021/0096225 A1 Apr. 1, 2021

(51) Int. Cl.
| | |
|---|---|
| *G01S 7/486* | (2020.01) |
| *G01S 17/10* | (2020.01) |
| *G01S 17/89* | (2020.01) |
| *G01S 17/02* | (2020.01) |
| *H04N 5/235* | (2006.01) |
| *G01S 7/4865* | (2020.01) |
| *G01S 17/86* | (2020.01) |
| *H04N 23/73* | (2023.01) |

(52) U.S. Cl.
CPC .......... *G01S 7/4865* (2013.01); *G01S 7/4868* (2013.01); *G01S 17/10* (2013.01); *G01S 17/86* (2020.01); *G01S 17/89* (2013.01); *H04N 23/73* (2023.01)

(58) Field of Classification Search
None
See application file for complete search history.

(56) References Cited

U.S. PATENT DOCUMENTS

| | | |
|---|---|---|
| 10,009,554 B1 | 6/2018 | Miao et al. |
| 10,115,034 B2 | 10/2018 | Hong et al. |
| 2006/0261996 A1* | 11/2006 | Augusto ............... H03M 1/125 341/155 |
| 2012/0271159 A1* | 10/2012 | Song ................. G01R 33/5601 600/420 |
| 2013/0076866 A1* | 3/2013 | Drinkard ................ G06T 7/596 348/47 |
| 2013/0094705 A1* | 4/2013 | Tyagi ....................... G06T 7/60 382/103 |
| 2014/0022349 A1 | 1/2014 | Kang |

(Continued)

OTHER PUBLICATIONS

The International Preliminary Report on Patentability for PCT Application No. PCT/US20/52769, dated Apr. 14, 2022.

(Continued)

*Primary Examiner* — Mohammad J Rahman
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can return pixels subject to over-exposure or saturation, which may be from stray light. In some examples, multiple exposures captured at different exposure times can be used to determine a saturation value for sensor data. The saturation value may be used to determine a threshold intensity against which intensity values of a primary exposure are compared. A filtered data set can be obtained based on the comparison.

20 Claims, 8 Drawing Sheets

(56) References Cited

U.S. PATENT DOCUMENTS

| | | | |
|---|---|---|---|
| 2014/0032054 A1* | 1/2014 | Hammadou | G06V 20/58 |
| | | | 701/45 |
| 2015/0301180 A1* | 10/2015 | Stettner | G01S 7/4818 |
| | | | 257/448 |
| 2016/0103210 A1* | 4/2016 | Ochimizu | G01S 7/4865 |
| | | | 356/5.01 |
| 2016/0125637 A1* | 5/2016 | Hyllus | G06T 15/005 |
| | | | 382/154 |
| 2017/0193312 A1* | 7/2017 | Ai | G06V 30/194 |
| 2017/0234976 A1* | 8/2017 | Grauer | B60Q 1/14 |
| | | | 356/5.04 |
| 2018/0203113 A1* | 7/2018 | Taylor | G06V 10/25 |
| 2019/0035064 A1 | 1/2019 | Franklin | |
| 2019/0124247 A1* | 4/2019 | Behrooz | H04N 5/35581 |
| 2019/0163992 A1 | 5/2019 | Mahon | |
| 2019/0195991 A1* | 6/2019 | Miki | G01S 7/4911 |
| 2019/0293792 A1 | 9/2019 | Keel et al. | |
| 2019/0391266 A1* | 12/2019 | Mori | G01S 17/10 |
| 2019/0394379 A1 | 12/2019 | Segapelli et al. | |
| 2020/0059589 A1* | 2/2020 | Liu | H01L 27/14605 |
| 2020/0068189 A1* | 2/2020 | Chen | H04N 13/286 |
| 2020/0327811 A1 | 10/2020 | Smith et al. | |
| 2020/0396399 A1 | 12/2020 | Tsai et al. | |
| 2021/0044767 A1* | 2/2021 | Rajasekaran | H04N 5/35536 |
| 2021/0064037 A1* | 3/2021 | Boutaud | G01S 17/42 |
| 2021/0096263 A1 | 4/2021 | Subasingha | |
| 2021/0242648 A1* | 8/2021 | Davidson | H01S 3/10061 |
| 2021/0361167 A1* | 11/2021 | Wolfe | A61B 5/7246 |

OTHER PUBLICATIONS

Office Action for U.S. Appl. No. 16/588,347, dated Aug. 19, 2022, Subasingha, "Power Control of Sensors Using Multiple Exposures", 21 pages.

Office Action for U.S. Appl. No. 16/588,347, dated Mar. 14, 2023, Subasingha, "Power Control of Sensors Using Multiple Exposures", 19 pages.

* cited by examiner

PIXEL FILTERING USING MULTIPLE EXPOSURES

BACKGROUND

Time-of-flight sensors may be unreliable in certain environments, including environments with varied lighting and/or environments containing objects with different reflective and absorptive properties. For instance, reflections off objects that are extremely close to the sensor, reflections off objects that have high reflectivity, and/or other high-illumination situations can result in unreliable pixel data. Unreliable pixel data may result in increased processing time to better understand the data and/or decreased efficiency in identifying and/or characterizing objects in the data. Worse, such high reflectivity may cause saturation, making it impossible to infer any information about the scene. When the time-of-flight sensor is intended for use on an autonomous vehicle, unreliable data can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
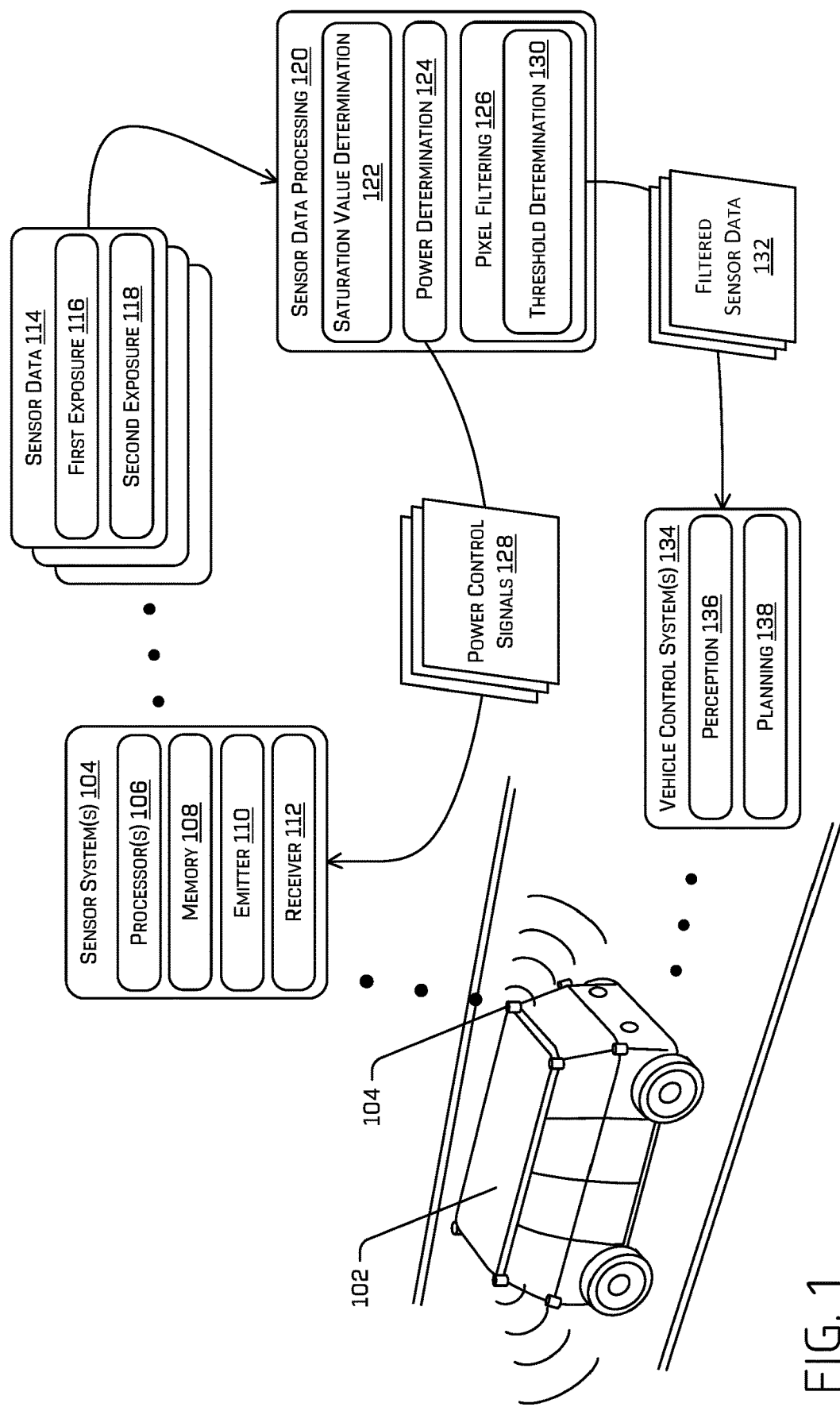
FIG. 1 is a schematic illustration showing an example vehicle, such as an autonomous vehicle, and example components and functionality of a sensor system associated with the vehicle, as described herein.

This disclosure describes methods, apparatuses, and systems for generating sensor data (and/or controlling sensor parameters to generate such sensor data) that can be used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for robustness purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances, intensity and distance information generated by time-of-flight sensors may be unreliable due to one or more of oversaturation, glare caused by highly reflective objects, pixel noise from stray light, under exposure, ambiguous returns, or the like. Techniques described herein can be used to improve sensor data, including time-of-flight sensor returns. For example, techniques disclosed herein may determine a saturation of an image using information from both a primary exposure generated by the sensor and secondary exposure information generated by the sensor and actively control illumination and sensing parameters based on the saturation metric. Moreover, techniques described herein can include using the saturation value to determine an intensity threshold to which intensity pixels in the primary exposure can be compared for filtering (e.g., removing and/or specifying "pixels" of the time-of-flight output based on the saturation value determined in order to provide better quality data to other components and subcomponents). Actively controlling the illumination and sensing parameters and/or filtering pixels according to techniques described herein can provide improved sensor data. Improved sensor data may result in a better understanding of the environment of the sensor, and, when the sensor is associated with a vehicle, techniques described herein can lead to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, such as a time-of-flight sensor, can be configured to generate multiple exposures, including a primary exposure and a secondary exposure. For example, the primary exposure and the secondary exposure may be captured at different exposure (or integration) times. In other examples, the primary exposure may be captured at a first illumination intensity and the secondary exposure may be captured at a second illumination intensity. For instance, the primary exposure may be captured at a longer exposure time and/or at a higher illumination intensity than the secondary exposure time. For example, the exposure time for the primary exposure may be on the order of from about 4 to about 10 times the exposure time of the secondary exposure. Of course, other parameters (such as frequencies of emission, etc.) are contemplated as varying between exposures. In some instances, the sensor may be configured to capture the primary exposure such that a plurality of pixels are saturated pixels, wherein the sensor may be configured to capture the secondary exposure such that very few or no pixels are saturated. In some examples, the secondary exposure can be captured at an exposure time that is a fraction of the exposure time associated with the primary exposure.

In implementations described herein, the primary exposure can include a single exposure or a plurality of blended or otherwise combined exposures, e.g., exclusive of data from the secondary exposure. For instance, the primary exposure can include or otherwise be used to generate image data comprising an intensity image and a depth image. For example, the intensity image can include per-pixel intensity values and the depth image can include per-pixel depth values. A system, such as a vehicle computing system, may use the intensity image and/or the depth image to identify one or more objects in proximity to the vehicle, and take appropriate actions. For instance, the system can take action to avoid the object(s) (e.g., when the vehicle is an autonomous vehicle) and/or generate an audible and/or visual response to war the object and/or passengers in the vehicle. In some examples, information about the secondary exposure information may be excluded from the primary exposure image data. Instead, systems described herein may use the secondary exposure information to alter parameters of the sensor. In other examples, the secondary exposure may be an exposure blended or combined with additional exposures to generate the primary exposure.

In some instances, information about the primary exposure and information about the secondary exposure may be used to determine a saturation value or saturation score for the exposures. In some examples, techniques described herein can determined unreliable or "bad" pixels in the primary exposure and/or the secondary exposure, and a number of such pixels may be used to determine the saturation value. Also in examples, measured intensities in the primary exposure and measured intensities in the secondary exposure can be used to determine the saturation value. For example, the saturation value can include a linear combination of intensities determined from the primary exposure (e.g., relatively high measured intensities in the primary exposure) and intensities of pixels determined from the secondary exposure (e.g., relatively high measured intensities in the secondary exposure).

In implementations described herein, the sensor and/or the sensor computing device can vary attributes of the sensor and/or processes using the sensor to generate improved sensor data, based on the saturation value. For instance, when the saturation value is above a first threshold, power associated with the primary exposure and the secondary exposure can be reduced. Alternatively, when the saturation is below a second (lower) threshold, the power associated with the primary exposure and the secondary exposure may be increased. Controlling the power based on such a saturation score/value (as detailed herein) provides a solution to the ambiguity of basing such power control on raw energy/power received determinations alone. In examples, the power may be changed to maintain a fixed ratio between the primary exposure and the second exposure, e.g., a fixed ratio of illumination energy, integration or exposure time, or the like. Accordingly, techniques described herein can alter sensor parameters for subsequently-captured first (and second) exposures. For example, some implementations can include varying an integration time, e.g., the time over which the return (reflected) signal is received. For instance, increasing the integration time can allow reflected signals to be received for a longer period of time, which can increase fidelity in low-light and/or for objects at a farther distance. In contrast, decreasing the integration time will reduce the time over which the reflected signal is received, which can reduce over-saturation, for example. Also in examples, the power of the illumination source can be changed to achieve similar results. A higher illumination power will increase signal strength (and thereby return signal strength), which can help prevent underexposure, whereas a lower illumination power can limit overexposure and/or saturation. Any combination of such changes in exposure time and/or illumination are contemplated herein.

In some examples, different configurations for the time-of-flight sensor may be determined dynamically. For example, the integration time and/or illumination power can be varied based on attributes of pixels, e.g., on an image-by-image basis, by calculating the saturation value for a set of exposures associated with a single instance of image data.

The saturation value may also be used to filter the primary exposure data. For instance, implementations described herein can determine a threshold intensity based at least in part on the saturation value. Measured intensity values from the primary exposure may then be compared to the threshold intensity. By way of non-limiting example, pixels in the primary exposure having a measured intensity greater than or equal to the threshold intensity determined from the saturation value may be retained, whereas pixels in the primary exposure having a measured intensity less than the threshold intensity may be removed or otherwise filtered out. The retained pixels may be included in filtered sensor data. Of course, such a determination may be formulated oppositely, as well (e.g., retaining only those which are less than or equal to some determined threshold).

In some examples, image data generated using the techniques described herein may be provided to, received by, or otherwise accessed by a computing device of an autonomous vehicle. For instance, the autonomous vehicle may use the image data to determine one or more trajectories for proceeding relative to objects determined from the filtered data. In some instances, depth and/or intensity information identified according to filtering techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to improve sensor data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by glare, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-8 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions that quantify glare and image data and/or correct the data to remove the impact of the glare, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

The sensor system(s) 104 can also include an emitter 110 and a receiver 112. In the example of FIG. 1, the sensor system(s) 104 may include a time-of-flight sensor, and the emitter 110 may be configured to emit a carrier (e.g., a signal) and the receiver 112 may be configured to receive, e.g., capture, a response carrier (e.g., a response signal). The response carrier may be the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

Aspects of the emitter 110 and/or aspects of the receiver 112 may be configurable. For instance, a modulation frequency and/or an intensity of the carrier emitted by the emitter 110 can be altered. For example, the illumination intensity associated with a carrier emitted by the emitter 110 can be altered by adjusting the voltage and/or frequency input to the emitter 110. Moreover, an integration or exposure time of the receiver 112 may be altered, e.g., by controlling an amount of time over which the receiver 112 collects response carriers. Altering the illumination power and/or the integration time can tune the sensor system(s) 104. For example, higher intensity illumination and/or longer integration times can result in increased performance in relatively lower ambient light environments and/or when the response carrier is from farther away objects and/or objects having lower reflectivity. Lower intensity illumination and/or shorter integration times can result in increased performance in relatively higher ambient light environments and/or when the response carrier is from relatively closer objects and/or objects having higher reflectivity.

As also illustrated in FIG. 1, the sensor system(s) 104 may be configured to output generated data as sensor data 114. For example, the sensor data 114 can include quadrature values, intensity and depth information, or the like. In the illustrated example, the sensor data 114 can include a first exposure 116 and a second exposure 118. As noted above, the emitter 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the first exposure 116 and/or the second exposure 118, e.g., as phase frames. In examples described herein, including below with reference to FIGS. 2 and 3, the sensor system(s) 104 may compute intensity and/or depth values based at least in part on phase values of a plurality of phase frames.

In at least some examples, an instance of the sensor data 114 may include an intensity image and/or a depth image as the first exposure 116 and intensity information and/or depth information as the second exposure 118. As detailed further herein, the first exposure 116 may be associated with a first time, e.g., based on light collected during a first integration time or first exposure time, and the second exposure 118 may be associated with a second time, e.g., based on light collected during a second integration time or second exposure time. In examples, the second time may be less than the first time, such that pixels are unlikely to be saturated in the second exposure. In at least some examples, the second exposure may be generated at an exposure time that is a fraction of the exposure time of the first exposure 116. In examples, the exposure time for the second exposure 118 may be on the order of about ¼ to about ⅛ the exposure time for the first exposure 116. The first exposure 116 and the second exposure 118 may be generated based on serially-collected reflected light. Stated differently, the first exposure 114 may be associated with a first exposure time period and the second exposure 116 may be associated with an immediately adjacent, e.g., immediately before commencement of the first exposure time or immediately after a conclusion of the first exposure time. In some instances, the first exposure 116 and/or the second exposure 118 can include image frames including intensity and depth values calculated using the phase frames. Such image frames can include a stream of serially-generated (e.g., at a predetermined interval) image frames. Generally, each of the image frames may include the same type of data, e.g., data related to the intensity and depth for each of a plurality of pixels comprising the receiver of the sensor. Specifically, the image frames can include a depth image and an intensity image generated by the sensor system(s) 104 and representative of a portion of the environment 100. Similarly, other instances of the image frames can include both an intensity image and a depth image representative of the environment 100 at the corresponding sensing time. In at least some examples, such additional exposure may be part of an HDR (high-dynamic range) image, such as one contemplated in the U.S. patent application entitled "Intensity and Depth Measurements in Time-of-Flight Sensors", having Ser. No. 16/198,208 filed on Nov. 21, 2018, the entire contents of which are hereby incorporated by reference. In any one or more examples, the secondary exposure may be in addition to any HDR exposures.

As noted above, different attributes of the environment 100 can result in degraded sensor data quality. For instance, ambient light, e.g., sunlight, may have the same or a similar wavelength as illumination light emitted and thus, can be perceived at pixels of the time-of-flight sensor as returns, despite not corresponding to emitted light. In high ambient light conditions, sunlight, in combination with light emitted by the emitter 110 can result in oversaturation of pixels. Moreover, highly reflective objects and/or objects that are extremely close to the sensor can result in stray light and/or glare that can adversely impact pixel quality. In addition, time-of-flight sensors may have a relatively short dynamic range, e.g., on the order of only a few meters, and returns off objects outside that dynamic range can be relatively weak, thus providing inaccurate depth and/or unreliable, and generally low, intensity measurements. Techniques described herein can use the first exposure 116 and the second exposure 118 to determine settings associated with the emitter 110 and/or the receiver 112, e.g., to reduce the impact of environmental factors, including those just described, on pixel quality. Controlling aspects of the emitter 110 and/or the receiver 112 can provide improved dataset that may better represent the environment and/or may have a higher associated confidence. Moreover, techniques described herein can use the first exposure 116 and the second exposure 118 to filter pixels from the first exposure 116 (and, in some instances, from the second exposure 118) to generated filtered data. For instance, filtered data can include only information (e.g., intensity and/or depth information) about objects in the environment 100, exclusive of background and/or unreliable pixels, as described further herein.

As illustrated in FIG. 1, a sensor data processing system 120 may be configured to receive the sensor data 114 generated by the sensor system(s) 104. In more detail, the sensor data processing system 120 can include a saturation value determination component 122 and a power determination component 124, and a pixel filtering component 126. For clarity, the sensor data processing system 120 (and its components) are illustrated separate from the sensor system(s) 104. However, portions of the sensor data processing system 120 may be implemented on the sensor system(s) 104. By way of non-limiting example, the processor(s) 106 may be configured to execute actions associated with the saturation value determination component 122, the power determination component 124, and/or the pixel filtering component 126.

The saturation value determination component 122 can include functionality to determine reliability of data associated with individual pixels, e.g., to determine whether data associated with a pixel is "good" or "bad," reliable or unreliable, or otherwise, and based on this determination, generate a score or value, e.g., a saturation score, representative of energy of the sensor data 114. In at least one example, the saturation value determination component 122 can determine unreliable pixels, e.g., from phase frames in the first exposure 116 and/or from phase frames in the second exposure 118. Phase frames can include phase values associated with the response carrier. The response carrier is expected to have properties or characteristics based on the shape of the carrier. By way of non-limiting example, the response carrier may be expected to be a continuous function, e.g., a sinusoid or the like. Accordingly, phase values should represent samples from the function. In one example, e.g., when the function is a sinusoid, the phase values associated with four phase frames taken at a fixed iteration (e.g., 90-degree iterations) should add to zero. Moreover, for four consecutively captured phase frames, the sum of (i) the difference between the third and the first phase values and (ii) the difference between the fourth and the second phase values should also equal zero. When the phase values for individual pixels do not conform to these properties, the saturation value determination component 122 can identify the pixel as unreliable. For instance, the saturation value determination can determine a pixel to be unreliable in only the first exposure 116 and/or in the second exposure 118. In at least some examples, the saturation value determination component 122 can also identify pixels that are saturated as unreliable pixels, as detailed further herein.

In some examples, the saturation value determination component 122 can also include functionality determine a quantity of bad or unreliable pixels. As will be appreciated, time-of-flight sensors can generate images comprising an array of thousands of pixels. After making a binary, e.g., good/bad, determination for each pixel, the saturation value determination component 122 can quantify a number of bad pixels and/or a ratio of bad pixels to good pixels. As described further herein, this number or ratio may be used to determine whether aspects of the emitter 110 and/or the receiver 112 should be adjusted. By way of example and not limitation, when the number or ratio exceeds a threshold number or ratio (e.g., 1/1, 2/1, or the like), aspects of the emitter 110 and/or the receiver 112 may be adjusted to reduce the number/ratio. In at least some examples, a numerical quality of the pixel may be determined (in a similar fashion) such that additional components which rely on the output of the sensor may take the quality of the pixel into account when performing various operations.

In addition to identifying and/or quantifying poor-quality pixels in the first exposure 116 and/or the second exposure 118, the saturation value determination component 122 can also determine additional information associated with pixels in the first exposure 116 and/or the second exposure 118. By way of non-limiting example, the saturation value determination component 122 can determine information about an intensity of the pixels identified as unreliable. For example, the intensity for these pixels can be determined from image frame(s) generated from and/or associated with the first exposure 116 and/or the second exposure 118 (e.g., from the intensity image). In some examples, the saturation value determination component 122 can determine a distribution of the bad pixels and/or an average intensity for these pixels. In addition to determining attributes associated with the intensity of poor-quality pixels, the pixel evaluation component 122 can also determine attributes associated with the intensity of all pixels in the sensor data 114 (e.g., good and bad pixels), including intensity and/or depth information from one or both of the first exposure 116 and/or the second exposure 118. For example, the saturation value determination component 122 may receive, generate, or otherwise access an intensity histogram to determine these attributes.

The saturation value determination 122 can also use the number/ratio of bad pixels, intensity attributes of those pixels, intensity attributes of all pixels, and/or other information about the first exposure 116 and/or the second exposure 118 to determine a saturation value or saturation score. For example, the saturation value may be a measure associated with an overall energy of the sensor data 114, which can be used to control parameters of the sensor system(s) 104 and/or control attributes of the sensor data 114, as detailed further herein. In some examples, the saturation value can be calculated using Equation (1):

$$S = 0.04 \times N_{high\text{-}energy\_primary} + 0.11 \times N_{high\text{-}energy\_secondary} + 10 \times \log(N_{unreliable\_primary} \times E_{unreliable\_primary} + 0.01) + 0.01 \times N_{med\text{-}high\ energy\_primary} \quad (1)$$

In the equation, S represents the saturation value, $N_{high\text{-}energy\_primary}$ is a number of pixels in the first exposure 116 that have an energy (or intensity) above a first threshold intensity, $N_{high\text{-}energy\_secondary}$ is a number of pixels in the second exposure 118 that have an energy (or intensity) above a second threshold intensity, $N_{unreliable\_primary}$ is a number or ratio of unreliable pixels, $E_{unreliable\_primary}$ is an energy of the unreliable pixels (e.g., an energy of $N_{unreliable\_primary}$), and $N_{med\text{-}high\ energy\_primary}$ is a number of pixels in the first exposure 116 having an energy above a third threshold energy, lower than the first threshold energy. In at least one example, $N_{high\ energy\_primary}$ may represent a number of pixels in a highest band in an intensity histogram associated with the first exposure 116, and $N_{high\ energy\_secondary}$ may represent a number of pixels in a highest band in an intensity histogram associated with the second exposure 118. In some examples, a histogram can include a distribution of pixels among a possible 256 different intensities (e.g., with 1 representing the lowest intensity or energy and 256 representing the highest intensity or energy), and $N_{high\ energy\_primary}$ and $N_{high\ energy\_secondary}$ may represent a number of pixels associated with the highest intensity (256) in the respective first exposure 116 and second exposure 118. In this example, $N_{med\text{-}high\ energy\_primary}$ may be a number of pixels associated with intensity values 64 through 256, inclusive. These numbers are for example only, as more, fewer and/or different intensity bands may be used for "high energy" and "mid-high energy." As will be appreciated, the coefficients in Equation (1) can vary dependent upon the application and/or desired outcome. For instance, the coefficients may be based on heuristics determined for a specific sensor system and/or application. By way of non-limiting example, the coefficients in Equation (1) may vary based on the sensor type, lens attributes or characteristics for the sensor, illumination characteristics, or the like. In some examples, the saturation value (5) may be used to determine whether, and how much, to alter power of the sensor (e.g., using the power determination component 124) and/or to filter pixels (e.g., using the pixel filtering component 126).

As illustrated, Equation (1) uses information about numbers of pixels and intensities of pixels for both the first exposure 116 and the second exposure 118. In other examples, the power determination component 124 can use other and/or additional factors. For instance, and as described above, additional attributes of the intensity of the image (e.g., including all pixels) may also be considered.

The power determination component 124 can use the saturation value to determine and/or implement power adjustments for the sensor system(s) 104. For example, the power determination component 124 can determine a power for the sensor system(s) 104 proportional to the saturation value. Because the saturation value is based on a linear combination of high intensity pixels in the first exposure 116 and the second exposure 118, the saturation value will be expected to be higher with higher overall intensities, and thus, the power determination component 124 may reduce the power of the sensor system(s) 104 to reduce the saturation value and/or the overall intensity. Similarly, a lower saturation value will be associated with a lower overall energy, and the power determination component 124 may increase the power of the sensor system(s) 104, to increase the saturation value and/or the overall intensity. In examples, the saturation value can be calculated as part of a power control loop, e.g., for each or some predetermined number of instance(s) of the sensor data 114 (where each instance can include an image frame or pair of first and second exposures 116, 118). The power determination component 124 can then determine an updated power in response to each newly calculated saturation value.

In other examples, the power determination component 124 can use thresholds for determining power adjustments. By way of non-limiting example, the power determination component 124 can compare the saturation value to a first threshold saturation value, and determine, based on the saturation value being equal to or below the first threshold, to increase the power associated with the sensor system(s) 104. The power determination component 124 can also compare the saturation value to a second threshold saturation value, and determine, based on the saturation value being equal to or greater than the second threshold, to decrease the power associated with the sensor system(s) 104. In this example, the second threshold is larger than the first threshold. In other examples, additional thresholds can be used, e.g., each with an associated power change. The power determination component 124 can use a look-up table or other means for determining the power to instruct and/or a change in the power.

Accordingly, the power determination component 124 can determine whether to adjust settings of the sensor system(s) 104. By way of non-limiting example, the power determination component 124 can determine whether to increase power or decrease power at the sensor system(s) 104 based on the saturation value. As used herein, controlling the power of the sensor system(s) 104 may be done in a number of ways. For example, power may be increased by one or both of controlling the emitter 110 to increase an illumination intensity and/or controlling the receiver 112 to increase an integration (or exposure) time. Conversely, power may be decreased by one or both of controlling the emitter to decrease an illumination intensity and/or controlling the receiver 112 to decrease the integration (or exposure) time.

To implement a power change, the power determination component 124 can also generate one or more power control signals 128, e.g., to control aspects of the sensor system(s) 104 to implement the determined change in power. For example, the power control signal(s) 128 can instruct a change in voltage and/or current supplied to the emitter 110, can instruct the receiver 112 to alter an integration or exposure time, and/or the like. As also illustrated in FIG. 1, the sensor data processing system 120 can output the power control signal(s) 128 to the sensor system(s) 104, e.g., to the emitter 110 and/or the receiver 112. The sensor system(s) 104 may then generate a next iteration of the sensor data 114 with the sensor system(s) 104 reconfigured according to the power control signal(s) 128. As will be appreciated, dynamically changing the power in accordance with techniques described herein can reduce the number of bad pixels in subsequent frames. In one example, by dynamically lowering power at a time-of-flight sensor, frames that would be substantially completely saturated, e.g., because of highly reflective and/or close objects, can be improved to reduce saturation (and, at least in some examples, maximizing an intensity), thereby allowing for better recognition of objects. This may be particularly useful in configurations in which the time-of-flight sensor is relied upon to sense objects in close proximity to a vehicle.

In examples, the power control signals 128 may include information for altering the controls signals associated with one or both of the first exposure 116 and/or the second exposure 118. In at least some examples, the second exposure 118 may be generated from reflected light captured for an exposure time that is a fixed ratio of an exposure time associated with the first exposure 116. For example, the second exposure 118 may have an associated exposure time that is from about one-eighth to about one-fourth of the exposure time associated with the first exposure 116. In other examples, only parameters associated with the first exposure 116 may be altered by the power controls signals. In examples, the power control signals may be based on a look-up table that correlates exposure times with the saturation value, by way of non-limiting example.

In the foregoing examples, the saturation value determination component 122 may be configured to perform a number of actions, including but not limited to, determining whether pixels are reliable, generating intensity information from phase values, and/or generating a saturation value for an instance of the sensor data 114. In other implementations, some or all of these function, as well as other functions described herein can be performed by other than the saturation valued determination component. By way of non-limiting example, other aspects of the sensor data processing system 120 (including components other than those illustrated) can perform some or all actions ascribed to the saturation value determination component. Moreover, the sensor system(s) 104 may be configured to perform some or all such functionality.

Moreover, additional aspects of determining unreliable and reliable pixels, as well as of controlling power in a sensor system based thereon, are detailed in U.S. patent application Ser. No. 16/550,156, entitled "Active Power Control of Sensors," filed Aug. 23, 2019. For example, techniques described therein may be implemented in connection with the functionality described herein. Without limitation, unreliable pixels may be determined in accordance with techniques descried in the '156 application in addition to or instead of the techniques described herein. The '156 application is hereby incorporated by reference in its entirety.

The sensor data processing system 120 is also illustrated as including a pixel filtering system 126. For instance, the pixel filtering component 126 can be configured to use the saturation value determined by the saturation value determination component 122 to generate filtered sensor data 132. As illustrated, the pixel filtering system 126 can include a threshold determination component 130. For clarity, the pixel filtering system 126 (and its component(s)) are illustrated separate from the sensor system(s) 104 and from one or more vehicle control system(s) 134. However, portions of the pixel filtering system 126 may be implemented on one or both of the sensor system(s) 104 and/or the vehicle control system(s) 134. By way of non-limiting example, the processor(s) 106 may be configured to execute actions associated with the threshold determination component 130.

The threshold determination component 130 may be configured to determine a threshold against which a measured value can be compared, e.g., to determine whether to filter (remove) the pixel or keep the pixel. In some examples, the threshold determination component 130 can determine a threshold intensity based on the saturation value determined using Equation (1), above. Measured values of pixels can then be compared to the threshold intensity, with pixels having an intensity below the threshold intensity being identified as unreliable or "bad" pixels and thus filtered out of, or otherwise excluded from, the filtered sensor data 132. In one example, the threshold determination component 130 can apply a single intensity threshold to all pixels, e.g., any pixels having an intensity below the threshold image are excluded whereas those having an intensity equal to or above the single intensity threshold are retained (for subsequent use and/or processing). However, applying a single intensity threshold to all pixels may be insufficient. In at least some examples, such a pixel filtering component 126 may associate a quality (e.g., as determined based at least in part on the saturation score) with each pixel (or portions of the pixels), as opposed to thresholding, such that additional downstream components may utilize such scores in determinations (e.g., one or more of the perception component 136 or the planning component 138).

In aspects of this disclosure, the threshold determination component 130 can determine, from the saturation value determined by the saturation value determination component 122, an intensity threshold for pixels in the sensor data 114, e.g., pixels in the first exposure 116 and/or the second exposure 118. The pixel filtering system 126 may then compare intensity data associated with the first exposure 116, e.g., on a per-point basis, to the threshold(s) determined using the saturation value. The first exposure 116 can then be filtered by comparing measured intensity values for pixels, e.g., from an intensity image associated with the first exposure 116, to the threshold. In examples, the threshold intensity can be based on the saturation value, as detailed further herein.

As noted above, the saturation value may be associated with an overall energy of the sensor data 114 (e.g., of an instance of sensor data including the first exposure 116, the second exposure 118, and/or other exposures). In some examples, when the saturation value is relatively higher, all pixels, including noisy pixels from stray light or the like, may also be expected to have relatively higher energy. Accordingly, the threshold determination component 130 may determine a relatively higher threshold. However, the threshold determination component 130 may determine a relatively lower threshold when the saturation value is relatively lower, e.g., because it may be expected that "good" pixels will have a relatively lower intensity and should not be removed by the pixel filtering system 126. In at least some examples, the threshold determination component 130 may determine a threshold intensity using Equation (2):

$$I = 2 + 0.7 \times T \quad (2)$$

Where T is a temporary variable determined based on the saturation value (S) calculated using Equation (1), described above. For instance, if the saturation value is greater than 120, the threshold determination component 130 can determine T using equation (3):

$$T = 20 + 0.7 \times (S - 120) \quad (3)$$

In this example, when the saturation value is equal to or less than 120, T may equal 20. Thus, based on the value T, the threshold determination component can determine the intensity threshold (I) against which intensity values of intensity pixels in the first exposure 116 are compared. In these examples, the pixel is removed or filtered out if the measured intensity is less than the threshold intensity (I), and retained when the measured intensity is greater than or equal to the threshold intensity (I).

Also in examples, the threshold determination component 130 can determine the threshold based on additional information. For example, the threshold determination component 130 may use Equation (3) only when the sensor data 114 has a relatively high energy. In at least one example, the threshold determination component 130 (or some other component) may determine an energy value, which may be an average of some pixel energy. In at least one example, the energy value may be an average of a predetermined number of energies associated with the pixels. For instance, the energy value may be the average of the four highest energies of the measured pixels in the sensor data 114, the first exposure 116, and/or the second exposure 118. The threshold determination component may calculate T as an average of the intensity pixels associated with the primary exposure 116 and/or the secondary exposure 118. In some examples, the threshold determination component 130 may only use Equation (3) when the energy value is above an energy threshold, e.g., 20, and otherwise use the average pixel intensity as T As will be appreciated, the threshold energy value (e.g., 20), the threshold saturation value (e.g., 120), and other variables used in Equations (2) and (3) are for example only. In some instances, some or all of these values, as well as other values described herein, may vary. For example, parameters of the sensor system(s) 104, aspects of the environment 100, and/or other aspects or parameters may be used to determine and/or alter these values. By way of non-limiting example, some or all of these values may be determined by experimentation, e.g., using heuristics.

In some examples, the threshold determination component 130 can determine the intensity threshold (I) to which all pixels in an exposure, e.g., the first exposure 116, can be compared by the pixel filtering system 126. Such filtering may be done in addition to other filtering techniques. For example, U.S. patent application Ser. No. 16/550,153, entitled "Reducing Noise in Sensor Data," filed Aug. 23, 2019, describes additional techniques for filtering pixels that may be performed before, after, or in parallel with the techniques described herein. The '153 application is hereby incorporated by reference in its entirety.

The threshold determination component 130 may also determine thresholds, e.g., intensity thresholds, using additional factors and/or techniques. By way of non-limiting example, the threshold determination component 130 may generate, receive, and/or otherwise access an intensity histogram. For example, the threshold determination component 130 may identify the energy value and/or the average intensity from the histogram, and determine the threshold intensity based thereon.

As also illustrated in FIG. 1, the pixel filtering system 126 can output the filtered sensor data 132, which may include pixels from the first exposure 116 and/or the second exposure 118 that have not been filtered based on the thresholds determined by the threshold determination component 130. In some instances, the filtered sensor data 132 can include a depth image and/or an intensity image, e.g., with the filtered points removed. By way of non-limiting example, the filtered sensor data 132 can include only those pixels associated with an object. As will be appreciated, in examples, information, including depth and/or intensity image, from the second exposure 118 may be excluded from the filtered sensor data 132. As described herein, the second exposure 118 may be an exposure captured at a reduced exposure time and information associated therewith may be used solely for tuning parameters, e.g., to control aspects of the sensor (via the power control signals 128) and/or to filter pixels from the first exposure 116. As a result, the second exposure may be subject to less processing than the first exposure 116, particularly when the first exposure 116 is a combination of multiple exposure, e.g., as described below with reference to FIG. 2. In other examples, however, the second exposure 118 can be combined or blended with the first exposure 116 and the pixel filtering system 126 can remove pixels from the combined exposure as the filtered sensor data 132.

As also illustrated in FIG. 1, the filtered sensor data 132 may be transmitted to the vehicle control system(s) 134, e.g., for use in controlling the vehicle 102. By way of non-limiting example, the vehicle control system(s) 134 can include a perception system 136 and a planning system 138. In examples, the perception system 136 may receive the filtered sensor data 132 and perform one or more of object detection, segmentation, and/or classification to determine objects represented therein. The planning system 138 may determine a trajectory or route for the vehicle 102, e.g., relative to objects perceived by the perception system 136 from the filtered sensor data 132.

Providing the vehicle control system(s) 134 with the filtered sensor data 132 can improve safety outcomes, e.g., relative to providing the vehicle control system(s) 134 with the first exposure 116, the second exposure 118, and/or blended information from the first exposure 116 and the second exposure 118, which can include noise from stray light and/or other factors. In at least some examples, time-of-flight sensors may be used on vehicles, such as the vehicle 102, to provide critical information about objects immediately surrounding the vehicle 102. Thus, removing noise from sensor data, and providing only data related to objects, can streamline processing, further increasing the speed at which these critical functions can be performed.

Figure 2:
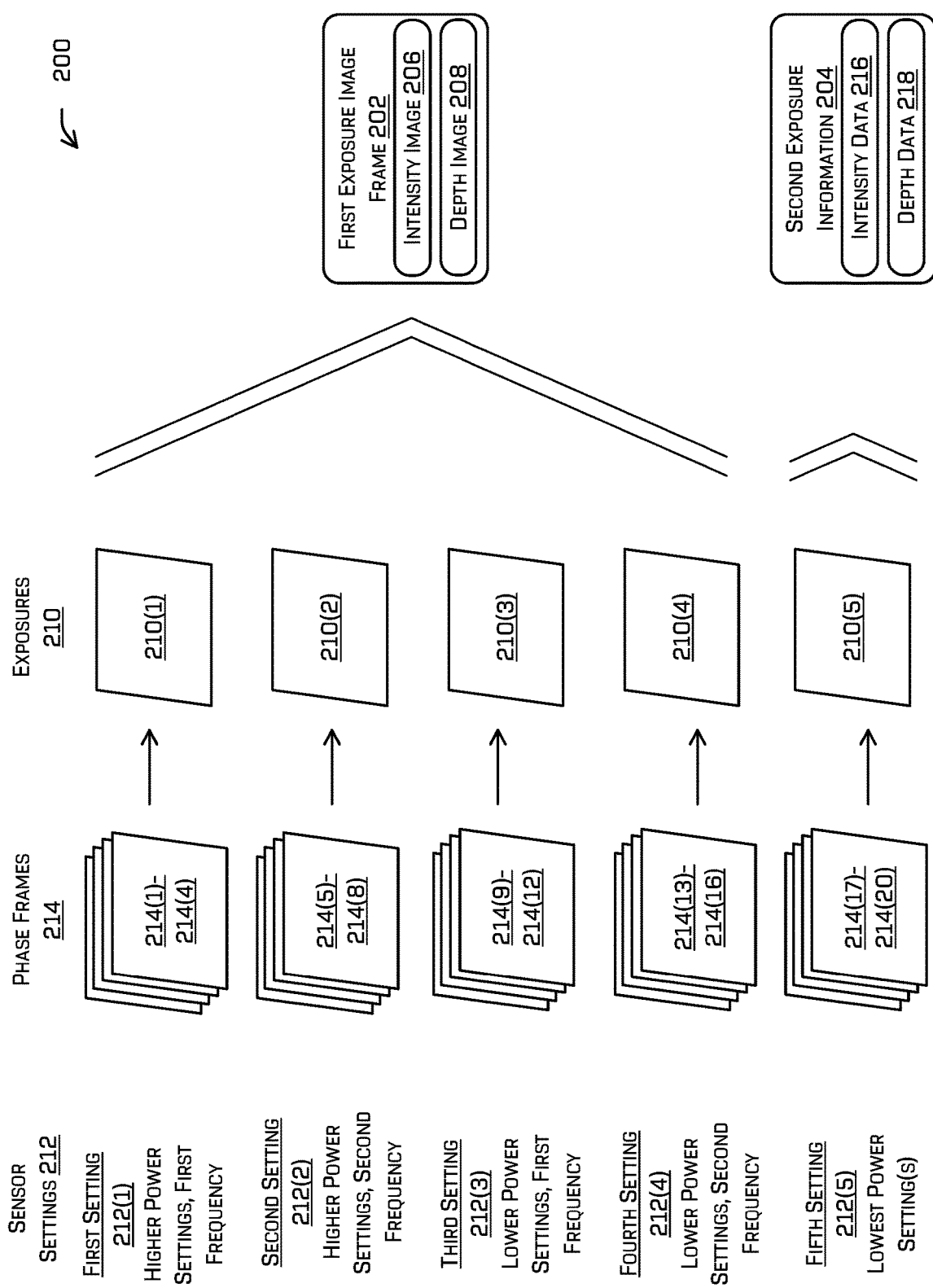
FIG. 2 is a schematic diagram illustrating aspects of sensor data generation at a sensor, such as a time-of-flight sensor, as described herein.

FIG. 2 is a schematic diagram 200 illustrating aspects of a sensor system, such as the sensor system(s) 104 described above. More specifically, the diagram 200 illustrates aspects of data capture conceptualizing how different types of data, in particular a first exposure image frame 202 and secondary exposure information 204 may be generated by the sensor, which may be a time-of-flight sensor. In this example, the first exposure image frame 202 may include an intensity image 206 and a depth image 208. The intensity image 206 can include per-pixel intensity values, and the depth image 208 can include per-pixel depth values. Although illustrated as including only the intensity image 206 and the depth image 208, the image frame 202 can include additional information, including but not limited to reflectivity information and/or confidence information. The illustrated primary exposure image frame 202 may be a single iteration of information (e.g., depth and intensity) corresponding to a sensed environment at a point in time. The image frame may be generated and/or output by the sensor at a predetermined interval, e.g., 10 Hz.

As illustrated, the first exposure image frame 202 can be generated from one or more exposures 210. In the illustration, the exposures 210 include a first exposure 210(1), a second exposure 210(2), a third exposure 210(3), and a fourth exposure 210(4). As detailed below, a fifth exposure 210(5) also may be generated by the sensor, but the fifth exposure is used to determine the second exposure information 204, independent of the first exposure image frame 202. Although four exposures are illustrated, more or fewer (including only a single exposure) may be used in examples described herein to generate the first exposure image frame 202. In examples, each of exposures 210 may correspond to different sensor settings 212, and the exposures 210(1)-210(4) can be combined or otherwise blended to generate the first exposure image frame 202. In FIG. 2, the sensor settings 212 include a first setting 212(1) having a relatively higher power setting (e.g., a higher illumination power or intensity and/or a longer integration time) and a first modulation frequency; a second setting 212(2) having the same power as the first setting 212(1) and a second modulation frequency; a third setting 212(3) having a relatively lower power setting (e.g., a lower illumination power/intensity and/or a shorter integration time) and the first modulation frequency; and a fourth setting 212(4) having the same power as the third setting 212(3) and the second modulation frequency. Of course, these are example settings only. Additional details about and techniques associated with generating an image frame from multiple exposures are disclosed in U.S. application Ser. No. 16/198,208, filed Nov. 21, 2018, and titled "Intensity and Depth Measurements in Time-of-Flight Sensors," the entire disclosure of which application is hereby incorporated by reference. As detailed therein, a resolved frame, which may correspond to the primary exposure image frame 202, may include blended intensity determined using multiple exposures (or frames of data) at different integration times and/or different illumination intensities and/or may include disambiguated depths determined using multiple frames of data determined at different modulation frequencies. In examples, to output the first exposure image frame 202 at a frequency of 10 Hz, each of the exposures 210(1)-210(4) may be generated at a frequency of 40 Hz in some examples.

As also illustrated in FIG. 2, each of the exposures 210 may be based at least in part on a plurality of phase frames 214. More specifically, the phase frames 214 may include the raw data, e.g., a phase value of the return carrier, received at the sensor. In the example, each of the exposures 210 may be based on four phase frames. In the example, the first exposure 210(1) is generated from the phase frames 214(1)-214(4), the second exposure 210(2) is generated from the phase frames 214(5)-214(8), the third exposure 210(3) is generated from the phase frames 214(9)-214(12), and the fourth exposure 210(4) is generated from the phase frames 214(13)-214(16). In examples, and as detailed further below in connection with FIG. 3, the phase frames 214 are used to model the return carrier and a correlation function may be generated based on the carrier and the model. The four values associated with phase frames are four points on the correlation function. The phase values from the phase frames 214 can be used in example implementations to determine whether to adjust one or more sensor settings, e.g., to adjust one or more of the sensor settings 212. Moreover, although FIG. 2 illustrates that each of the exposures 210 is generated from four of the phase frames 214, more or fewer (e.g., as few as two) phase frames 214 may be used in implementations. In the example provided above in which the exposures 210 are generated at a frequency of 40 Hz, the phase frames 214 can be generated at a frequency of 160 Hz in some examples.

Accordingly, FIG. 2 illustrates that the first exposure image frame 202, including an intensity image 206 and/or a depth image 208 can be generated from a plurality of serially-captured exposures (e.g., the exposures 210(1)-210(4)). For instance, because the exposures 210(1)-210(4) are captured at different settings of the time-of-flight sensor, certain exposures may provide more reliable information for certain aspects of the field of view. By way of non-limiting example, the higher-power settings associated with the first setting 212(1) and/or the second setting 212(2) may result in saturated pixels, but fewer of those pixels may be saturated at the lower power settings associated with the third settings 212(3) and/or the fourth setting 212(4). Thus, intensity information of the primary exposure image frame 202 (e.g., information for pixels in the intensity image 206) may be determined from the third exposure 210(3) and/or the fourth exposure 210(4). In examples, the primary exposure image frame 202 can be used, e.g., by the vehicle control system(s) 134, to identify objects, determine distances of the objects from the sensor(s), and/or plan a path or trajectory relative to the objects.

As also illustrated in FIG. 2, aspects of this disclosure can also include using the sensor to capture the second exposure information 204, e.g., independent of the first exposure image frame 102. As illustrated, the secondary exposure information 204 can include intensity data 216 and/or depth data 218, which may correspond, respectively, to intensity values and/or depth values for pixels on the receiver. The secondary exposure information 204 can be generated from a fifth exposure 210(5), generated at a fifth sensor setting 212(5). In examples, the fifth setting 212(5) can be associated with one or more lowest power settings. For instance, the fifth setting 212(5) may be associated with an exposure time that is lower than the exposure time associated with any of the first through fourth settings 212(1)-212(4). In at least some examples, an exposure time associated with the fifth setting 212(5) can be a fraction of the exposure time associated with the settings 212(1)-212(4) used to generate the primary exposure image frame 202. For instance, the exposure time can be on the order of about one-eighth to about one-quarter of an exposure time associated with the first setting 212(1). Without limitation, the sensor settings can include exposure times on the order of from about one or more microseconds to about several milliseconds. For example, the exposure time associate with the first setting 212(1) may be about 50 microseconds to about 1000 milliseconds. In at least some examples, the exposure time can be a fixed ratio of the exposure time associated with the first setting 212(1). Moreover, although the previous discussion describes generating the secondary exposure information 204 at a reduced exposure time, the fifth setting 212(5) can also or alternatively include a lower illumination intensity of the light emitted by the emitter to achieve a similar result.

In implementations, the fifth exposure 210(5) can be captured serially after the four exposures 210(1)-20(4) on which the first exposure image frame 202 is based. Because of the rapid sampling to generate the phase frames 214, e.g., on the order of about 160 Hz, the phase frames 214(17)-214(20) from which the fifth exposure 210(5) is generated are contemporaneous with the exposures 210(1)-210(4) from which the first exposure image frame 202 is created. Thus, per-pixel information in the second exposure information 204 will generally align with per-pixel information in the first exposure image frame 202.

In examples, the secondary exposure information 204 may be generated to minimize (or eliminate) saturation at pixels. In at least some examples, the fifth setting 212(5) may be chosen to eliminate saturation. By avoiding saturation, for example, the secondary exposure information 204 can be useful for adjusting parameters of the sensor and/or for improved generation of the primary exposure image frame 202. Stated differently, the intensity data 216 and the depth data 218 of the secondary exposure information 204 may be excluded from the intensity image 206 and the depth image 208, but the intensity data 216 and/or the depth data 218 may be used in determining aspects of the primary exposure image frame 202. For example, and as noted above, the saturation value determination component 122 may use aspects of the intensity data 216, e.g., a number of pixels of a highest energy in the intensity data 216 ($P_{high\ energy\_secondary}$), to determine a saturation value and/or the threshold determination component 130 may use information from the second exposure information 204 to determine a threshold intensity against which intensity pixels in the first exposure image frame 202 are compared for filtering.

Although FIG. 2 illustrates the second exposure information 204 as being separate from the exposures making up the first exposure image frame 202, in other examples, the second exposure information 204 can be based on any one of the exposures used to generate the first exposure image frame 202. By way of non-limiting example, the second exposure information 204 described herein can be associated with a lower-power setting, such as that associated with the third exposure 210(3) or the fourth exposure 210(4). For instance, the intensity data 216 and/or the depth data 218 may be generated from the phase frames 214(9)-214(12) and/or 214(13)-214(16). As described herein, the second exposure information 204 may be associated with an exposure time that is a fixed ratio relative to the exposure time at which the higher-power phase frames 214 are captured, and such ratio may be achieved by altering aspects of the third setting 212(3) and/or the fourth setting 212(4).

Figure 3:
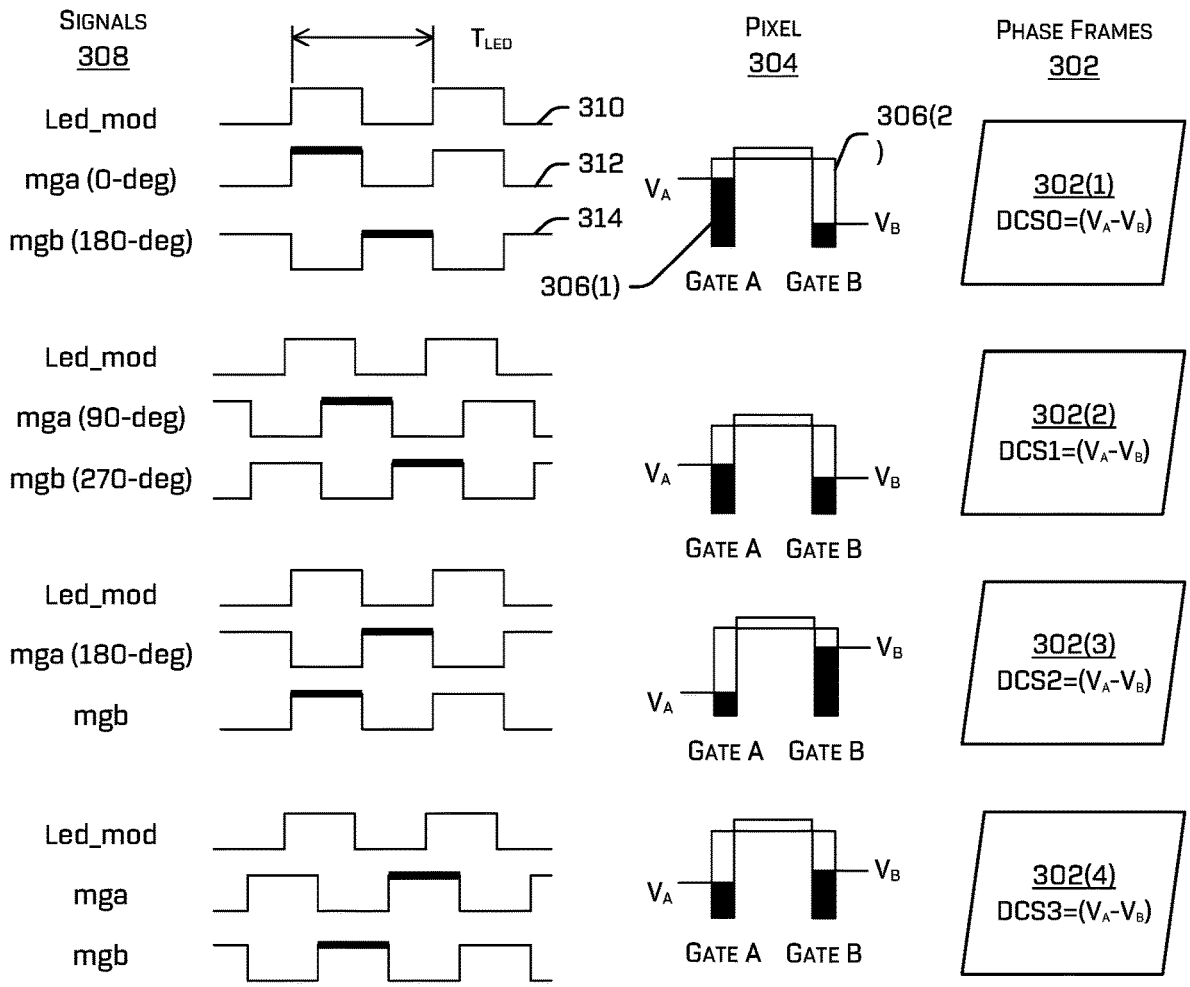
FIG. 3 is a schematic diagram illustrating additional aspects of sensor data generation at a sensor, such as a time-of-flight sensor, as described herein.
Figure 3:
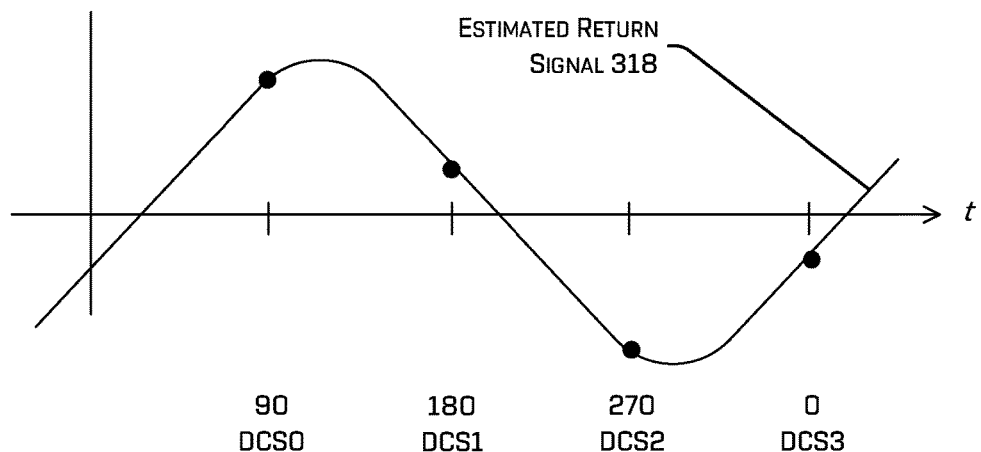

FIG. 3 is a schematic diagram 300 illustrating additional aspects of sensor data generation at a sensor, such as a time-of-flight sensor. For example, the diagram 300 illustrates how depth and/or intensity information are generated, e.g., as the intensity image 206 and the depth image 208 and/or as the intensity data 216 and the depth data 218. More specifically, FIG. 3 illustrates aspects of how a set of four phase frames 302 (including a first phase frame 302(1), a second phase frame 302(2), a third phase frame 302(3), and a fourth phase frame 302(4)) is generated at a receiver, such as the receiver 112. For instance, the four illustrated phase frames 302 may correspond to the phase frames 214(1)-214(4), the phase frames 214(5)-214(8), the phase frames 214(9)-214(12), the phase frames 214(13)-214(16), or the phase frames 214(17)-214(20). Accordingly, the diagram 300 generally represents how information about a single exposure, such as one of the exposures 210, may be generated.

As illustrated, each of the phase frames 302 includes a phase value (e.g. DCS0, DCS1, DCS2, DCS3). For example, the pixel 304 can include a first potential well 306(1) and a second potential well 306(2) associated, respectively, with a first gate (Gate A) and a second gate (Gate B). In operation, when one of the gates is opened, the respective potential well 306 fills with electrons in accordance with a number of photons coming into contact with the pixel 304. The gates are opened (and closed) based on signals 308 applied to the pixel. In the illustration, a first signal 310 (Led_mod) represents a modulation signal applied to the light emitter of the sensor. A second signal 312 (mga) and a third signal 314 (mgb) are gate signals applied, respectively, to Gate A and Gate B to configure the potential wells 306 to accumulate electrons. In the examples, the second signal 312 and the third signal 314 are the same signal phase-shifted by 180-degrees, such that the gates are alternately opened. The accumulation of electrons in the wells 306 is illustrated with VA and VB in FIG. 3 and the phase value (DSC) is calculated as a difference between VA and VB. As shown, four phase measurements are determined as the four phase frames 302. Each of the frames 302 is associated with a different phase shift (e.g., a 0-degree phase shift, a 90-degree phase shift, a 180-degree phase shift, and a 270-degree phase shift) of the second signal 312 and the third signal 314 (e.g., the gate signals) relative to the first signal 310.

As illustrated in the graph 316 in the FIG. 3, each of the phase values (DCS values) can be plotted against time. Also in the graph 316, an estimated return signal 318 is fit to the plotted phase values. The estimated return signal 318 is a function that can be compared to the modulated waveform (of the emitted light) to determine aspects of sensed data. For example, an offset of the return signal 318 from the modulated waveform can be used to calculate a distance (or depth) associated with the exposure. Moreover, the phase values can be used to determine an intensity of the pixel for the exposure. For example, the intensity can be computed using Equation (4):

$$I = \sqrt{(DSC3-DSC1)^2 + (DSC2-DSC0)^2} \qquad (4)$$

As discussed above, aspects of this disclosure use two gates (A, B) for each phase frame 302, e.g., to determine the DSC values. The use of two gates can be used to account for ambient light in the measurement. For example, and as noted above, ambient light, such as from the sun, and/or stray light, e.g., from highly reflective objects in the sensor's field of view, can be received at the pixel 304 in addition to the reflected carrier. Such light can be accounted for, e.g., as noise, by alternating signals to Gate A and Gate B as shown. Specifically, the gates will accumulate the same amount of ambient light, and that ambient light will be subtracted out when determining the difference that is the phase value. However, when one or both of the gates becomes saturated, e.g., one or both of the potential wells is filled, the phase values may be unreliable and, thus, depth and/or intensity values calculated from the phase values may also be unreliable.

In implementations, the calculated phase values can be used to determine whether the pixel (e.g., data associated with photons collected at the pixel) is reliable or unreliable. For example, because the phase values are periodic measurements on the estimated return signal 318, values of the phase values will follow certain rules. For instance, the sum of the four phase values will equal zero (or a value that is substantially zero). That is, the phase values should comport with Equation (5):

$$DSC0 + DSC1 + DSC2 + DSC3 = 0 \qquad (5)$$

Therefore, if the sum of the phase values associated with the phase frames 302(1)-302(4) does not equal zero, the collected data may be unreliable, of inferior quality, or otherwise bad. Other arithmetic means may also be used to determine whether the information generated from the phase frames 302 is reliable. For instance, the phase values should comport with Equation (6):

$$DSC0 + DSC2 - DSC3 - DSC1 = 0 \qquad (6)$$

Therefore, if the phase values do not abide by Equation (6), the phase collected data may be unreliable. As will be understood, "zero" herein can include any value that is substantially zero, which may be a value that is within a tolerance or margin of error of zero, which may be 5%, 10% or more. In examples described herein, the saturation value determination component 122 can use information about whether pixels are unreliable (and about a number of unreliable pixels) to determine the saturation value, e.g., according to Equation (1).

Although either of Equation (5) or Equation (6) can be used to determine whether pixels are reliable, such equations may be inadequate in some instances. For example, in implementations in which both the first well and the second well are saturated, e.g., in the presence of an abundance of ambient light, the difference between VA and VB will approach zero, such that each of DSC0, DSC1, DSC2, and DSC3 will approach zero. Thus, the pixel will appear to comport with Equation (5) and Equation (6). Thus, the pixel may be identified as a reliable or valid pixel, but inaccurately. Stated differently, as more ambient light fills the potential wells 306, less room is available for the return carrier.

Figure 4:
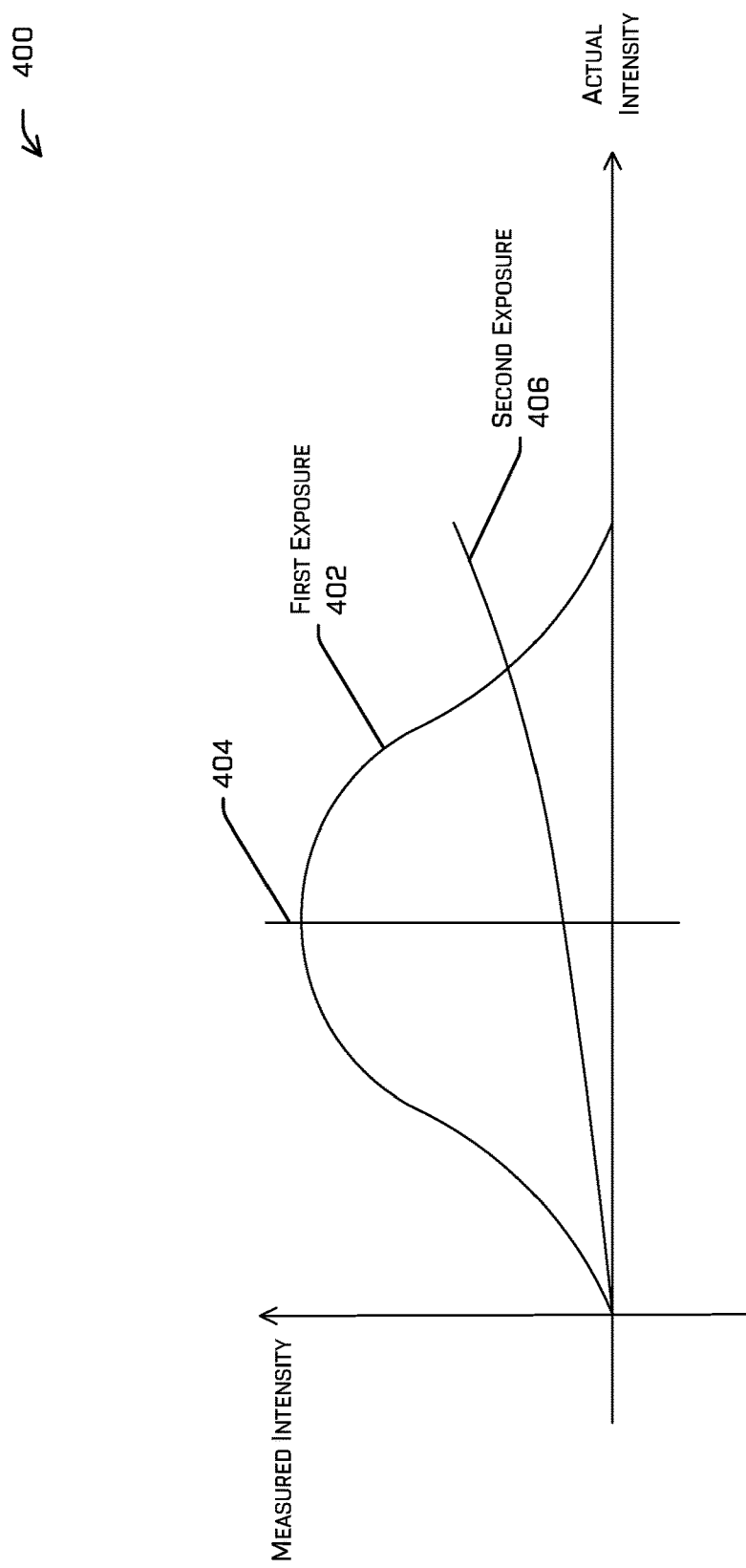
FIG. 4 illustrates graphs associated with aspects of sensor data generation at a sensor using multiple exposures, as described herein.

FIG. 4 further demonstrates related concepts. More specifically, FIG. 4 includes a graph 402 showing the relationship of a measured intensity (e.g., as measured using Equation (3), above) to an actual intensity. In the example, the graph 402 may be associated with a first exposure, which can be one of the exposure 210(1), 210(2), 210(3), or 210(4) discussed above. In the illustration, a vertical line 404 generally indicates a situation at which neither well is saturated, but one of the wells is at capacity. After this point, e.g., to the right of the vertical line 404 and as the actual intensity further increases, the measured intensity begins to reduce, e.g., because one of the wells is still full (and thus has the same, maximum value) while the other well also continues to fill up. As this second well continues to fill, e.g., with increased ambient light or a strengthened return signal, the measured intensity will eventually approach zero, e.g., because the DSC values approach zero when both wells are saturated.

Accordingly, from the graph 402 it can be understood that a measured intensity can correspond to one of two actual intensities, e.g., depending on the horizontal side of the vertical line 404. In implementations of this disclosure, a second exposure, e.g., the second exposure 210(5), can be used to determine the location of the intensity. Specifically, FIG. 4 also shows a graph 406 associated with second exposure. As described herein, a second exposure can be generated at a reduced exposure time at which substantially no pixels are saturated. Accordingly, because the potential wells 306 are highly unlikely to become saturated for the second exposure, each measured intensity in the second exposure will correspond to a unique actual intensity. For example, Equation (1), described above, may represent a linear combination of the graph 402 and the graph 406, which can implicitly provide information about the side of the line 404 on which a measured intensity is located. As a result, a comparison (or combination) of the measured intensity for the first exposure to the measured intensity for the second exposure, will implicitly indicate whether the first exposure does, in fact, include saturated potential wells 306. As will be appreciated, the presence of saturated potential wells can suggest that the exposure (or integration) time of the time-of-flight sensor should be decreased and/or the lack of saturated potential wells can suggest that the exposure (or integration) time of the time-of-flight sensor should be increased.

Figure 5:
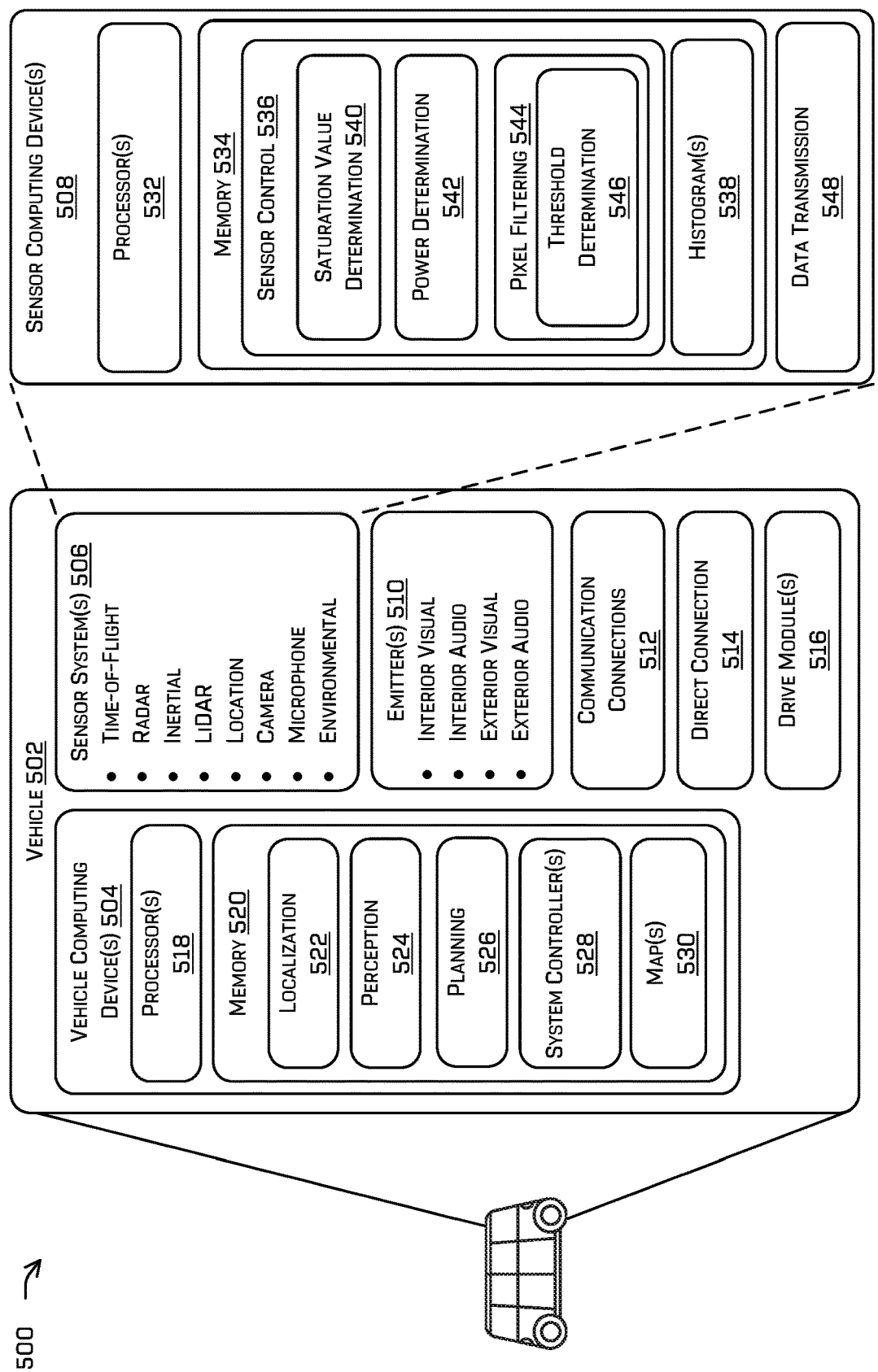
FIG. 5 depicts a block diagram of an example computing system for controlling sensors, such as time-of-flight sensors, using multiple exposures, as described herein.

FIG. 5 depicts a block diagram of an example system 500 for implementing the techniques discussed herein. In at least one example, the system 500 can include a vehicle 502, which can be similar to (or the same as) the vehicle 102 described above with reference to FIG. 1. In the illustrated example 500, the vehicle 502 is an autonomous vehicle; however, the vehicle 502 can be any other type of vehicle.

The vehicle 502 can include one or more vehicle computing devices 504, one or more sensor systems 506, which may include one or more sensor computing devices 508, one or more emitter(s) 510, one or more communication connections 512, at least one direct connection 514 (e.g., for physically coupling with the vehicle 502 to exchange data and/or to provide power), and one or more drive modules 516. In some instances, the vehicle 502 can include more or fewer instances of the vehicle computing device(s) 504. The sensor system(s) 506 can be configured to capture sensor data associated with an environment. In examples, the sensor system(s) 506 can include the sensor system(s) 104.

The vehicle computing device(s) 504 can include one or more processors 518 and memory 520 communicatively coupled with the one or more processors 518. In at least one instance, the processor(s) 518 can be similar to the processor(s) 106 and the memory 520 can be similar to the memory 108 described above with reference to FIG. 1. In the illustrated example, the memory 520 of the vehicle computing device(s) 504 stores a localization component 522, a perception component 524, a planning component 526, one or more system controllers 528, and one or more maps 530. Though depicted as residing in the memory 520 for illustrative purposes, it is contemplated that the localization component 522, the perception component 524, the planning component 526, and/or the system controller(s) 528 can additionally, or alternatively, be accessible to the vehicle computing device(s) 504 (e.g., stored in a different component of vehicle 502 and/or stored remotely).

In at least one example, the localization component 522 can include functionality to receive data from the sensor system(s) 506 to determine a position of the vehicle 502. In examples, received data can include a depth image and/or an intensity image. In other implementations, the localization component 522 can include and/or request/receive a three-dimensional map, e.g., of the map(s) 530 of an environment and can continuously determine a location of the autonomous vehicle within the map. In some instances, the localization component 522 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 502. In some instances, the localization component 522 can provide data to various components of the vehicle 502 to determine an initial position of an autonomous vehicle for generating a candidate trajectory, as discussed herein.

In some examples, the perception component 524 can include functionality to perform object detection, segmentation, and/or classification. In some examples, the perception component 524 can receive data and generate processed sensor data that indicates a presence of an object in the environment of, e.g., proximate, the vehicle 502 and/or a classification of the object as an object type (e.g., car, pedestrian, cyclist, building, tree, road surface, curb, sidewalk, unknown, etc.). In additional and/or alternative examples, the perception component 524 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 526 can determine a path for the vehicle 502 to follow to traverse through an environment. For example, the planning component 526 can determine various routes and trajectories and various levels of detail. In some examples, the planning component 526 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 526 can generate an instruction for guiding the autonomous vehicle along at least a portion of the route from the first location to the second location. In at least one example, the planning component 526 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 526 can alternatively, or additionally, use data from the perception component 524 to determine a path for the vehicle 502 to follow to traverse through an environment. For example, the planning component 526 can receive data from the perception component 524 regarding objects associated with an environment. Using this data, the planning component 526 can determine a route to travel from a first location (e.g., a current location) to a second location (e.g., a target location) to avoid objects in an environment.

As noted above, the vehicle computing device(s) 504 can include the system controller(s) 528, which can be configured to control steering, propulsion, braking, safety systems, emitters, communication systems, and/or other systems of the vehicle 502. The system controller(s) 528 can communicate with and/or control corresponding systems of the drive module(s) 516 and/or other components of the vehicle 502, which may be configured to operate in accordance with a trajectory provided from the planning component 526.

In some examples, the map(s) 530 can be stored on a remote computing device. Multiple maps 530 can be stored based on, for example, a characteristic (e.g., type of entity, time of day, day of week, season of the year, etc.). Storing multiple maps 530 can have similar memory requirements, but increase the speed at which data in a map can be accessed.

In at least one example, the sensor system(s) 506 can be similar to the sensor system(s) 104 described above with reference to FIG. 1. The sensor system(s) 506 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504.

The sensor system(s) 506 can include the sensor computing device(s) 508, which can include one or more processors 532 and memory 534 communicatively coupled with the one or more processors 532. The one or more processors 532 can be similar to the processor(s) 106 and/or to the processor(s) 518, described above. The memory 534 can be similar to the memory 108 and/or to the memory 520, described above. In the illustrated example, the memory 534 of the sensor computing device(s) 508 can store a sensor control system 536 and one or more histograms 538. The sensor control system 536 can include a saturation value determination component 540, a power determination component 542, and a pixel filtering system 544. The pixel filtering system 544 can include a threshold determination component 546. Though depicted as residing in the memory 534 for illustrative purposes, it is contemplated that the sensor control system 536 (as well as its associated components), the pixel filtering system 544 (as well as its associated components), and/or the histograms 538 can additionally, or alternatively, be accessible to the sensor system(s) 506 (e.g., stored in a different component of vehicle 502 and/or stored remotely). Moreover, although the sensor control system 536 (as well as its associated components), the pixel filtering system 544 (as well as its associated components), and the histograms 538 are illustrated as being stored in and/or part of the sensor computing device(s) 508, in other implementations any or all of these components may be stored in the memory 520 and/or in some other, not illustrated memory, such as a remote memory associated with a remote computing device. That is, although FIG. 5 illustrates several components as being part of the sensor computing device(s) 508 of the sensor system(s) 506, the processing associated with any or all of those components may be performed other than at the sensor. In one example, the sensor system(s) 506 may output raw data, e.g., phase values, as discussed above, for processing in accordance with functionality ascribed herein to one or more of the sensor control system 536, the saturation value determination component 540, the power determination component 542, the pixel filtering component 544, and/or the threshold determination component 546, but that processing may be performed other than at the location of the emitter and the receiver. Moreover, the histograms 538 may be generated (and stored) other than by the sensor computing device(s) 508. Without limitation, the sensor system(s) 506 can include on-board processing capabilities to perform any or all functionality described herein and associated with generating control commands to control the vehicle 502 and/or to filter pixels in data generated from a primary exposure using information from a secondary exposure. Alternatively, processing of the sensor data may be processed other than at the sensor system(s) 506.

Components of the sensor computing device(s) 508 may be configured to generate and/or process data in many formats. For example, and as noted above, the sensor computing device(s) 508 can measure a phase shift between the carrier and the response carrier and/or perform numerical integration calculations to determine the sensor data in the quadrature format. In other examples, the sensor computing device(s) 508 can determine an intensity and depth format of the sensor data, e.g., generate the depth and intensity images. For purposes of illustration only, the sensor system(s) 506 can determine the sensor data in the intensity and depth format where an individual pixel in the sensor data is associated with an 8-bit value for the intensity and a 12-bit value for the depth.

The sensor control system 536 can be configured to receive sensor data generated by the sensor system(s) 506, e.g., by a time-of-flight senor, and generate controls to alter aspects of the sensor system(s) 506, e.g., to improve subsequent returns. In examples described herein, adjusting power, e.g., illumination intensity and/or integration time, and/or filtering pixels using thresholds can result in better, e.g., more reliable, sensor data. For example, and as detailed herein, data generated by time-of-flight sensors can include noise, especially from stray light caused by a number of factors. Reducing the number of unreliable pixels can provide down-stream systems with improved data. In examples described herein, pixel noise can be particularly problematic in implementations in which a distance to objects in the environment is required, e.g., to safely travel through an environment relative to such objects.

The saturation value determination component 540 can calculate a saturation metric from information associated with two contemporaneous exposures. For instance, and as described herein, the saturation metric may be based on a number of unreliable pixels and/or intensity information associated with pixels in one or both of a first (e.g., primary) exposure and/or a second (e.g., secondary) exposure. For example, the saturation value determination component 540 can make a binary decision that determines whether a pixel is reliable or unreliable, e.g., good or bad. Moreover, and as detailed further herein, the saturation value determination component 540 can determine whether pixels are unreliable and/or determine the saturation value based at least in part on information associated with unreliable pixels. In some examples, the saturation value determination component 540 can determine the saturation value by solving Equation (1), above. The saturation value determination component 540 can correspond to the saturation value determination component 122 detailed above.

The power determination component 542 can determine a power change for controlling the sensor system(s) 506, e.g., by generating a power control signal. The power determination component 542 can correspond to the power determination component 124 detailed further herein. In some examples, the power determination component 542 can determine a power change for the sensor based at least in part on the saturation value. For instance, when the saturation value is below a first threshold, the power determination component 542 may generate a power control signal to instruct an increase in power at the sensor system(s) 506. For instance, the power control signal can cause the sensor system(s) to increase an illumination intensity and/or increase an integration or exposure time. When the saturation value is above a second threshold, the power determination component 542 may generate a power control signal to instruct a decrease in power at the sensor system(s) 506. For instance, the power control signal can cause the sensor system(s) 506 to decrease the illumination intensity and/or decrease an integration or exposure time. Other details of the power determination component 542 are described herein.

The pixel filtering system 544 can filter sensor data, e.g., by removing pixels from sensor data. In some examples, the pixel filtering system 544 may be the same as and/or perform functionality similar to or the same as functionality described above in connection with the pixel filtering system 126. For example, the pixel filtering system 544 can remove pixels from sensor data, such as the sensor data 114, that are below an intensity threshold. In example implementations, the pixel filtering system 126 can remove pixels from a first exposure based on information from a second exposure associated with the first exposure. Additional details of the pixel filtering system 126 are described herein.

The threshold determination component 546 can determine a threshold intensity against which measured intensities can be compared. For instance, the threshold determination component 546 can be the same as the threshold determination component 130. In examples, the threshold determination component can determine the threshold intensity based at least in part on the saturation value determined by the saturation value determination component 540. In at least some examples, the threshold determination component can solve one or both of Equations (2) and/or (3). Additional details of functioning that may be performed by the threshold determination component is described herein.

The sensor computing device(s) 508 may also include functionality to generate the histograms 538. For instance, the histograms 538 may include, for each instance of image data, distributions of the depths and/or intensity values in the image data. As detailed further herein, the histograms 538 may be used, e.g., by the saturation value determination component 540 to determine intensities associated with pixels and/or classes or groups of pixel and/or by the pixel filtering system 544 to determine an energy value, as detailed further herein.

The sensor computing device(s) 508 of the sensor system(s) 506 can also include a data transmission component 548. The data transmission component 548 can transmit the sensor data, e.g., filtered sensor data, from the sensor computing device(s) 508, e.g., to the localization component 522, the perception component 524, and/or the planning component 526.

The emitter(s) 510 are configured for emitting light and/or sound, as described above. In the illustrated example, the emitter(s) 510 can include interior visual and/or interior audio emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 510 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 512 enable communication between the vehicle 502 and one or more other local or remote computing device(s), including the sensor computing device(s) 508. For instance, the communication connection(s) 512 can facilitate communication with other local computing device(s) on the vehicle 502 and/or the drive module(s) 516. Also, the communication connection(s) 512 can allow the vehicle to communicate with other nearby computing device(s) (e.g., other nearby vehicles, traffic signals, etc.). The communications connection(s) 512 can also enable the vehicle 502 to communicate with a remote teleoperations computing device or other remote services.

The communications connection(s) 512 can include physical and/or logical interfaces for connecting the vehicle computing device(s) 504 to another computing device or an external network (e.g., the Internet). For example, the communications connection(s) 512 can enable Wi-Fi-based communication such as via frequencies defined by the IEEE 802.11 standards, short range wireless frequencies such as Bluetooth, cellular communication (e.g., 2G, 5G, 5G, 5G LTE, 5G, etc.) or any suitable wired or wireless communications protocol that enables the respective computing device to interface with the other computing device(s).

In some examples, the drive module(s) 516 can include a single drive module 516. In other examples, the vehicle 502 can have multiple drive modules, and individual drive modules 516 can be positioned on opposite ends of the vehicle 502 (e.g., the front and the rear, etc.). In at least one example, the drive module(s) 516 can include one or more sensor systems to detect conditions of the drive module(s) 516 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 516. In some cases, the sensor system(s) on the drive module(s) 516 can overlap or supplement corresponding systems of the vehicle 502 (e.g., the sensor system(s) 506).

The drive module(s) 516 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 516 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 516. Furthermore, the drive module(s) 516 also include one or more communication connection(s) that enable communication by the respective drive module with one or more other local or remote computing device(s).

The processor(s) 518 of the vehicle 502, the processor(s) 532 of the sensor computing device(s) 508, and/or the processor(s) 106 of the sensor system(s) 104 can be any suitable processor capable of executing instructions to process data and perform operations as described herein. By way of example and not limitation, the processor(s) 518, 532, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 520, 534, 108 are examples of non-transitory computer-readable media. The memory 520, 534, 108 can store an operating system and one or more software applications, instructions, programs, and/or data to implement the methods described herein and the functions attributed to the various systems. In various implementations, the memory 520, 534, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 520, 534, 108 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 6:
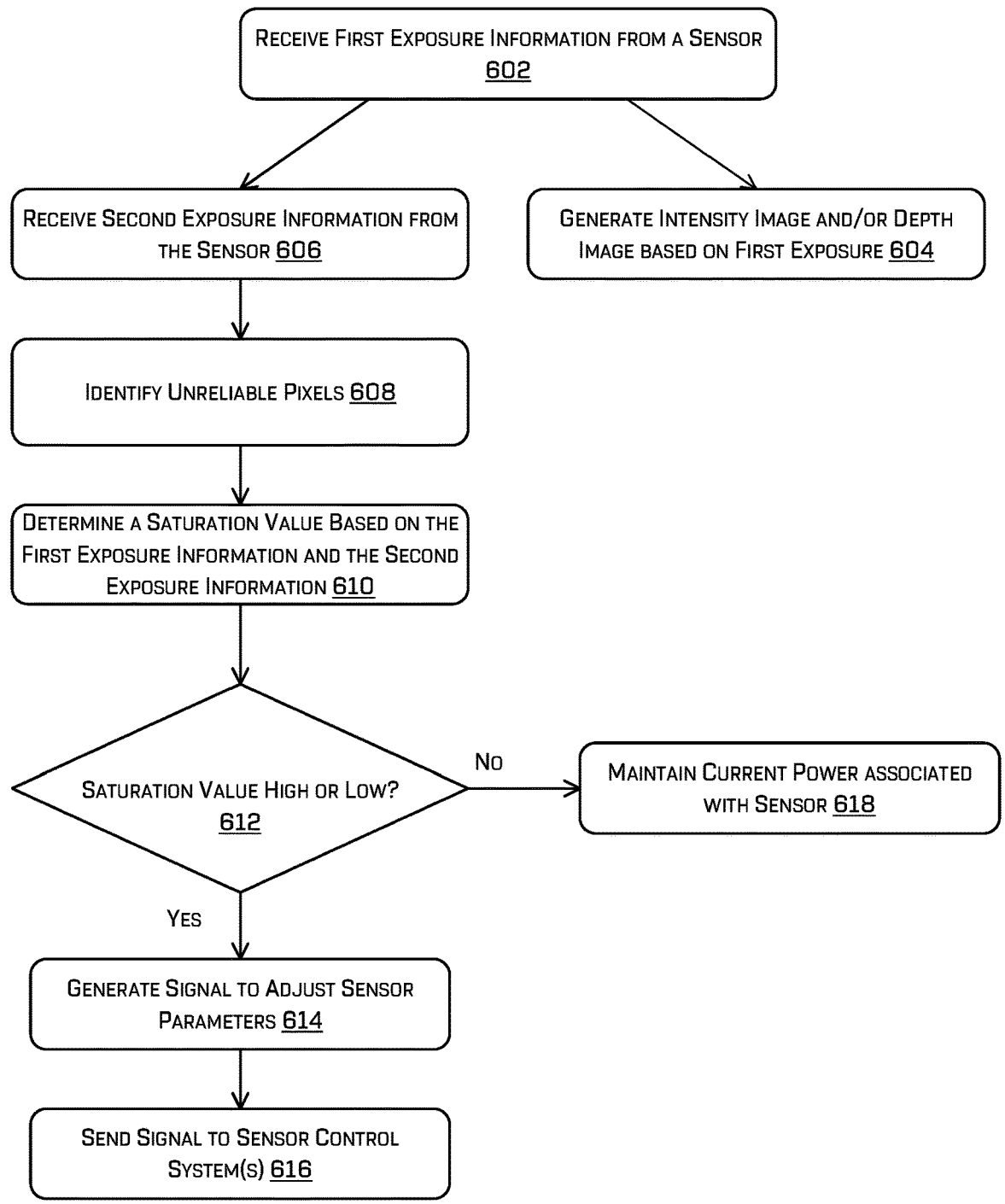
FIG. 6 is a flowchart illustrating an example method for dynamic power control in a sensor, such as a time-of-flight sensor, using multiple exposures, as described herein.
Figure 7:
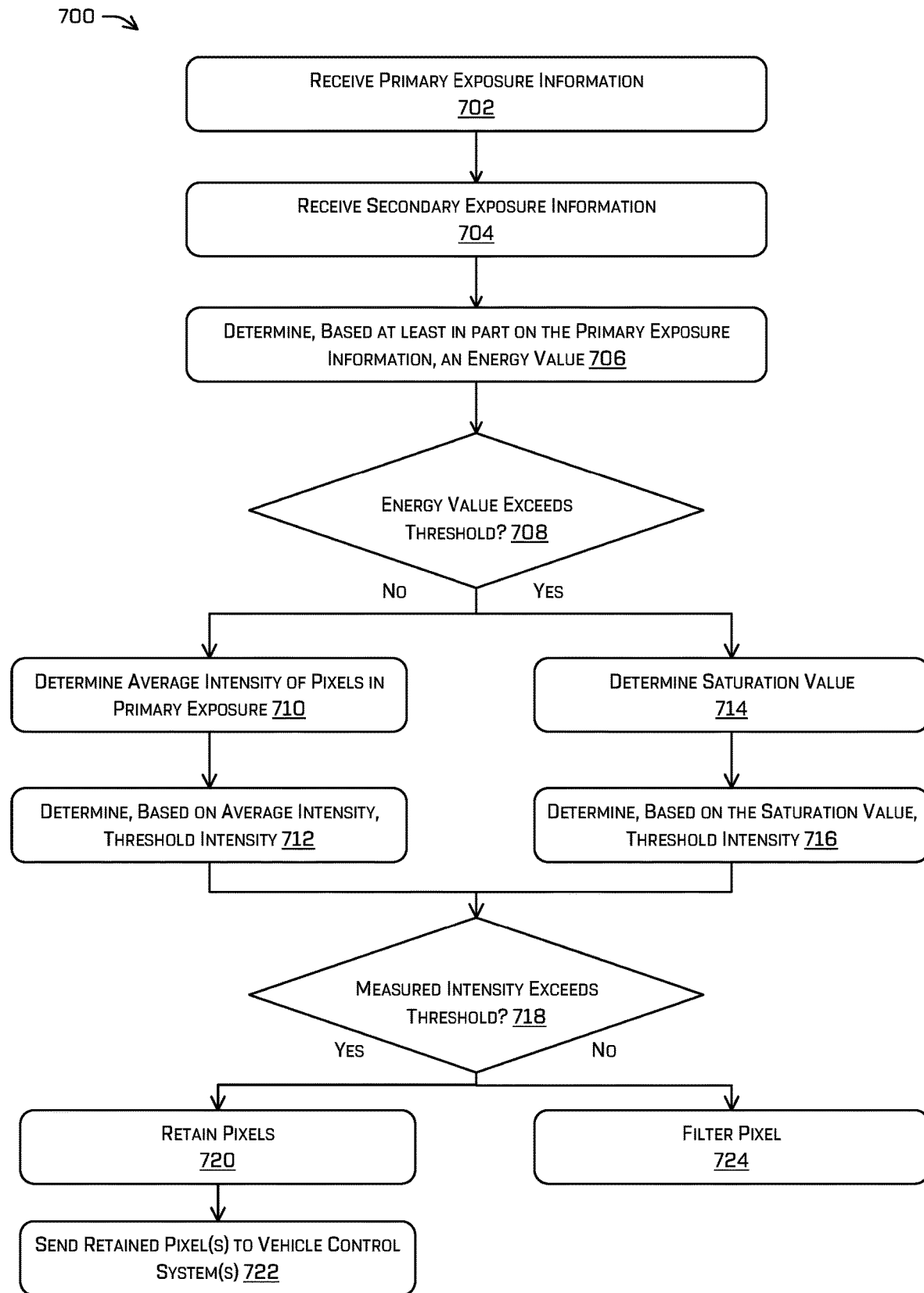
FIG. 7 is a flowchart illustrating an example process for filtering pixels in a primary exposure using information from a secondary exposure.
Figure 8:
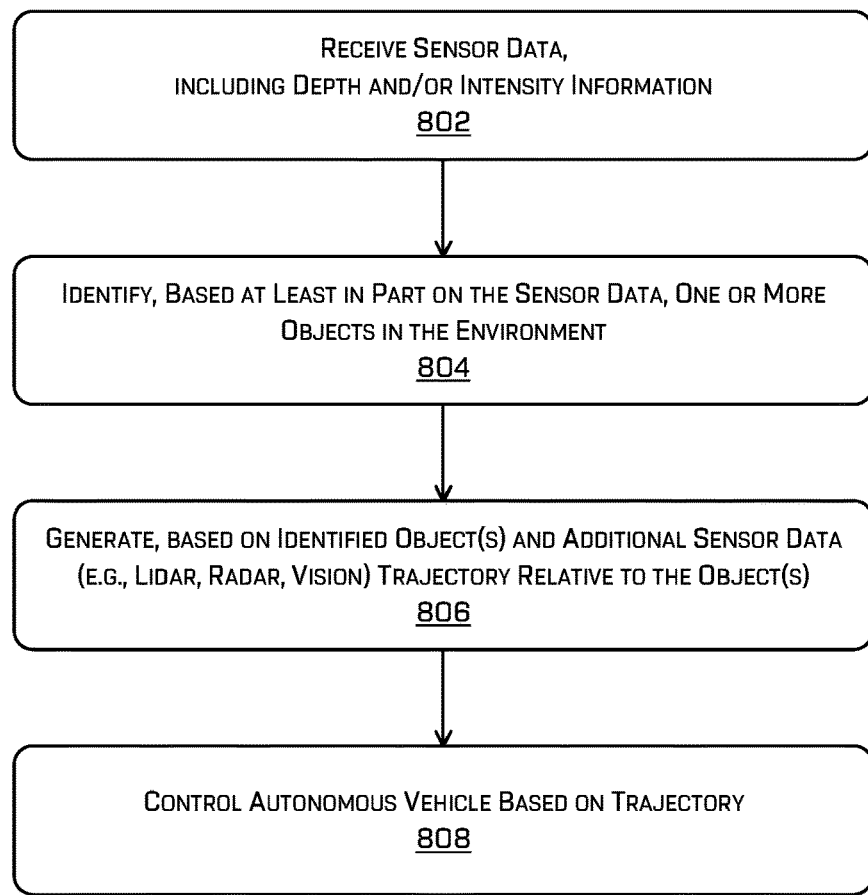
FIG. 8 is a flowchart illustrating an example method for controlling a vehicle relative to obstacles sensed by a sensor, such as a time-of-flight sensor, as described herein.

FIGS. 6, 7, and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 6 depicts an example process 600 for dynamic power control of a sensor system, such as a time-of-flight sensor. For example, some or all of the process 600 can be performed by the sensor system(s) 104 and/or by one or more components illustrated in FIG. 5, as described herein. For example, some or all of the process 600 can be performed by the sensor computing device(s) 508 of the sensor system(s) 506, including, but not limited to, the saturation value determination component 540 and/or the power determination component 542. However, the process 600 is not limited to being performed by these components, and the components are not limited to performing the process 600.

At operation 602, the process 600 includes receiving first exposure information from a sensor. For example, techniques described herein may be useful for active control of a time-of-flight sensor based on sensor data received from the time-of-flight sensor. In some examples, the time-of-flight sensor may generate raw data, e.g., embodied as phase frames, and/or processed image data, e.g., a depth image describing depths for individual measured pixels and an intensity image describing intensities for the individual measured pixels. The first exposure may be generated based on one or more carriers received at a receiver of the time-of-flight sensor during a first exposure time.

At operation 604, the process 600 includes generating intensity image and/or depth image based on the first exposure information. For example, the process 600 can include generating data from the first exposure for subsequent use by an autonomous vehicle computing device. In examples, the intensity image may be used to identify one or more objects in an environment of the autonomous vehicle and the depth image may be used to determine a range or distance to the identified object(s).

At operation 606, the process 600 can include receiving second exposure information from the sensor. For example, the second exposure information can be phase frames and/or image frames corresponding to a lower power than the first exposure. For instance, the second exposure information can be generated at an exposure time that is lower than an exposure time of the first exposure information. The first exposure time may be a multiple of the second exposure time, e.g., 4 or 8 times the second exposure time. In examples, the first exposure and the second exposure can be generated at substantially the same time, e.g., to capture substantially the same environment. For instance, pixels in the first exposure may correspond to pixels in the second exposure, generally on a one-to-one basis.

At operation 608, the process 600 can include identifying unreliable pixels and/or otherwise filtering the images associated with the one or more exposures based on any of the techniques described (or incorporated) herein. For instance, and as described herein, pixels can be unreliable, or "bad," when phase frame information associated therewith fails to meet a certain characteristic or property. Unreliable pixels can be determined in the first exposure information and/or in the second exposure information, and, because pixels generally correspond in the first exposure information and the second exposure information, regardless of which pixel is unreliable, the pixels may be deemed unreliable in both exposures. Also in examples, pixels can be unreliable if they are saturated and/or if one or both of the potential wells associated with the pixel at the receiver is saturated. In examples, the operation 608 may determine the number of bad pixels for the image (which, as described herein, may correspond to pixels in either or both of the intensity image and the depth image and/or may be determined from the phase frames, e.g., in the absence of the intensity and/or depth images), and in some instances, the number of bad pixels may be compared to the number of good pixels, e.g., as a ratio.

At operation 610, the process 600 can include determining a saturation value based on the first exposure information and the second exposure information. For example, as described above in connection with Equation (1), a saturation value can be based on at least one of the number of unreliable pixels in the first exposure and/or the second exposure, an energy associated with those pixels, and/or additional intensity information, e.g., intensity information of some or all of the reliable pixels in either or both of the first exposure or the second exposure. In examples, the operation 610 may use an intensity image, including a distribution of intensities of the unreliable pixels determined from the intensity image.

At the operation 612, the process 600 can include determining whether the saturation value is high or low. For example, the saturation value may be compared to a first saturation value threshold and/or to a second, relatively higher second saturation value threshold. In examples, the operation 612 may determine that the saturation value is below the first saturation value threshold, which may indicate that power associated with the sensor can be increased. Or, the operation 612 may determine that the saturation value is above the second saturation value threshold, which may indicate that the power associated with the sensor is too high, and should be decreased.

If, at the operation 612, it is determined that the saturation value is either high or low, at operation 614 the process can include generating a signal to adjust the sensor parameters. For instance, the process 600 can determine new sensor parameters based on determining that the saturation value is high. In examples, when the saturation value is relatively high, the signal to adjust the sensor parameters can be an instruction to lower a power associated with the sensor, e.g., by decreasing the illumination intensity and/or reducing an integration or exposure time. Conversely, when the saturation value is relatively low, the signal to adjust the sensor parameters can be an instruction to increase a power associated with the sensor, e.g., by increasing the illumination intensity and/or increasing the integration or exposure time.

In examples, the instruction to decrease or to increase the power may apply to capturing both the first exposure and the second exposure. By way of non-limiting example, attributes associated with capturing the second exposure may be altered to maintain a fixed ratio between the exposure time associated with each of the first exposure and the second exposure.

At operation 616, the process 600 can also include sending the signal to one or more sensor power control systems. For example, the signal may be a signal to an emitter and/or a receiver of the time-of-flight sensor. Upon receipt of the power signal, the sensor may configure components of the sensor to implement the desired change. Accordingly, subsequent image data can be captured with the sensor adjusted to improve pixel capture.

Alternatively, if, at the operation 612, it is determined that the saturation value is not high or low, an operation 618 of the process 600 can include maintaining the current power associated with the sensor. For example, if the saturation value is not above a first saturation threshold and is not below a second, relatively higher saturation threshold, the current power settings for capturing the first exposure and the second exposure may be maintained.

FIG. 7 depicts an example process 700 for filtering sensor data, e.g., by filtering individual pixels from image data. For example, some or all of the process 700 can be performed by the sensor system(s) 104 and/or by one or more components illustrated in FIG. 5, as described herein. For example, some or all of the process 700 can be performed by the sensor computing device(s) 508 of the sensor system(s) 506, including, but not limited to, the saturation value determination component 540 and/or the pixel filtering system 544. However, the process 700 is not limited to being performed by these components, and the components are not limited to performing the process 700.

In more detail, at operation 702, the process 700 includes receiving primary exposure information. For example, techniques described herein may be useful for filtering pixels in sensor data received from a time-of-flight sensor. In some examples, the time-of-flight sensor may generate raw data, e.g., embodied as phase frames, and/or processed image data, e.g., a depth image describing depths for individual measured pixels and an intensity image describing intensities for the individual measured pixels. The first exposure may be generated based on one or more carriers received at a receiver of the time-of-flight sensor during a first exposure time.

At operation 704, the process 400 can include receiving second exposure information from the sensor. For example, the second exposure information can be phase frames and/or image frames corresponding to a lower power than the first exposure. For instance, the second exposure information can be generated at an exposure time that is lower than an exposure time of the first exposure information. The first exposure time may be a multiple of the second exposure time, e.g., 4 or 8 times the second exposure time. In examples, the first exposure and the second exposure can be generated at substantially the same time, e.g., to capture substantially the same environment. For instance, pixels in the first exposure may correspond to pixels in the second exposure, generally on a one-to-one basis.

At operation 706, the process 700 can alternatively include determining, based at least in part on the primary exposure information, an energy value. For example, the energy value can be an average intensity associated with a subset of all the pixels of the primary exposure. In at least some examples, the energy value may be an average intensity associated with pixels having the highest energy in the primary exposure. For example, the energy value may be the average intensity of the four highest intensity pixels in the primary exposure. In other instances, the energy value can further be determined based at least in part on the secondary exposure information.

At operation 708, the process 700 can alternatively determine whether the energy value (determined at the operation 706) exceeds a threshold. For instance, when the energy value exceeds a certain threshold, it may be determined that saturation of pixels is more likely, e.g., because the pixels are of higher energy or intensity, and thresholding may be performed in a first manner. Alternatively, where the energy value is below the threshold, saturation may be less likely, and thresholding may be performed in a second manner, as detailed further herein. As noted, the operations 706 and 708 may be optional, and filtering may be done in accordance with either the operations 710 and 712 or the operation 714 and 716.

In more detail, if, at the operation 708 it is determined that the energy value does not exceed the threshold, at an operation 710 the process 700 can include determining an average intensity of the pixels in the primary exposure. For example, the average intensity can be determined from histograms associated with primary exposure information or directly from an intensity image, or the like. Although the operation 710 uses the average intensity, this is for example only. Other examples could use a weighted average or some other intensity value.

At operation 712, the process 700 can include determining, based on the average intensity, a threshold intensity. For example, the threshold intensity can be the average intensity or some intensity derived from the average intensity. In other examples, the threshold intensity may be otherwise derived from the intensity values associated with the primary exposure, e.g., at the exclusion of the secondary exposure information.

Alternatively, if at the operation 708 it is determined that the energy value exceeds the threshold, an operation 714 can include determining a saturation value. For example, the saturation value may be based on the first exposure information and the second exposure information. For example, and as described above in connection with Equation (1), a saturation value can be based on at least one of the number of unreliable pixels in the first exposure and/or the second exposure, an energy associated with some or all of those pixels, and/or additional intensity information, e.g., intensity information of some or all of the reliable pixels in either or both of the first exposure or the second exposure. In examples, the operation 714 may use an intensity image, including a distribution of intensities of the unreliable pixels determined from the intensity image, and/or histograms associated with the intensity image.

At an operation 716, the process 700 can include determining, based on the saturation value, a threshold intensity. For example, the threshold determination component 130, 546 the threshold intensity can be determined using Equations (2) and/or (3), described above.

At operation 718, the process 700 can include determining whether a measured intensity exceeds the intensity threshold. For instance, the operation 718 can include determining measured intensities for pixels in the primary exposure (e.g., from an intensity image) received at the operation 702, and comparing the measured intensities to the threshold intensity determined at the operation 718. For example, every pixel may be compared to the same threshold, determined at the operation 712 and/or the operation 716.

If, at the operation 718, it is determined that the intensity value exceeds the intensity threshold, at operation 720 the process 700 includes retaining the pixels. For instance, pixels may be determined to be valid, accurate, or reliable when they have a value above the threshold intensity, and thus may be retained for further processing. In examples, the retained pixels may be associated with an accurately sensed object, as opposed to pixels that are saturated or otherwise over-exposed.

At operation 722, the process 700 can also include sending the retained pixel(s) to one or more vehicle control systems. For example, the sensor data may be associated with a sensor, such as a time-of-flight sensor disposed on a vehicle, and the sensor data may be used to identify objects and control the vehicle to navigate relative to the objects. In examples the retained pixels may be sent to a vehicle control system as the filtered sensor data 132. In examples, the filtered sensor data may include a subset of the pixels or information from the primary (or first) exposure. The filtered sensor data 132 may exclude information from the secondary (or second) exposure, although in other implementations, the primary exposure may be a combination or blend of sensor data from the first exposure and the second exposure. For example, the primary exposure can include an HDR image that uses a first exposure and a second exposure to determine intensity and/or depth for pixels in the field of view of the sensor, and, in this example, the second exposure used in the HDR image may be the secondary exposure received at the operation 704.

Alternatively, if, at the operation 718, it is determined that the intensity value is below the intensity threshold, at operation 724, the process 700 includes filtering the pixel. For instance, the pixel may be determined to be a saturated pixel or a pixel for which one of the potential wells is saturated, and thus is filtered from the sensor data. Such pixels may be unreliable or inaccurate. In examples, the filtered pixel can be removed, suppressed, ignored, or otherwise filtered.

FIG. 8 depicts an example process 800 for controlling an autonomous vehicle relative to objects in an environment, as discussed herein. For example, some or all of the process 800 can be performed by the vehicle 102 of FIG. 1 and/or the vehicle 502 and its related components illustrated in and discussed with reference to FIG. 5. For example, some or all of the process 800 can be performed by the localization component 522, the perception component 524, the planning component 526, and/or the one or more system controllers 528.

At operation 802, the process can include receiving sensor data, including depth and/or intensity information. The sensor data may include a depth image and an intensity image containing per-pixel values for pixels that were not filtered out, e.g., in the process 700. Also in examples, the sensor data may include only those pixels associated with an object. The sensor data may be received from the time-of-flight sensor on a frame-by-frame basis, e.g., the sensor system may output data comprising a first frame (which includes both the depth image and the intensity image), a second frame, etc. In other examples, the sensor data may be a resolved frame, e.g., including blended intensity determined using multiple frames of data at different integration times and/or different illumination intensities and/or disambiguated depths. In still further embodiments the sensor data may be a representation of the environment, e.g., an image of the environment, generated using data from the time-of-flight sensor and/or data generated based on the data from the time-of-flight sensor.

At operation 804, the process 800 can include identifying, based at least in part on the filtered sensor data, one or more objects in the environment. For example, the localization component 522 and/or the perception component 524 may receive the depth and/or intensity data at 802 and identify objects in the environment. For example, the vehicle computing device(s) 504 may classify objects based on the sensor data and map the objects in the environment relative to the vehicle 502, e.g., using one or more maps. For instance, the depth and/or intensity information may be used, either alone or in combination with other data, to determine one or more bounding boxes, such as three-dimensional bounding boxes, representative of the sensed objects.

At operation 806, the process 800 can include generating, based on the identified object(s) and additional sensor data (e.g., LiDAR data, radar data, vision data), a trajectory relative to the object(s). For example, the planning component 526 of the vehicle computing device(s) 504 can further determine relative movement, e.g., velocity and acceleration, of the objects in the environment using one or more sensor modalities, object classification data, and the maps and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 808, the process 800 can include controlling an autonomous vehicle to follow the trajectory. In some instances, the operation 808 can include generating commands that can be relayed to a controller onboard an autonomous vehicle to control the autonomous vehicle to drive the travel path. Although discussed in the context of an autonomous vehicle, the process 800, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example vehicle includes: a time-of-flight sensor configured to generate data based on light received at a receiver of the time-of-flight sensor; one or more processors; and memory storing processor-executable instructions that, when executed by the one or more processors, configure the vehicle to perform acts comprising: receiving, from the time-of-flight sensor, first sensor data comprising a plurality of first phase frames, the first phase frames comprising first phase values for pixels of the receiver, and the first sensor data being associated with a first exposure time; receiving, from the time-of-flight sensor, second sensor data comprising a plurality of second phase frames, the second phase frames comprising second phase values for the pixels of the receiver, and the second sensor data being associated with a second exposure time shorter than the first exposure time; determining, based at least in part on the first sensor data and the second sensor data, a plurality of unreliable pixels of the pixels; determining first intensity information from the first phase values and second intensity information from the second phase values, the first intensity information comprising an intensity pixel; determining, based at least in part on the number of unreliable pixels, the first intensity information, and the second intensity information, a saturation value associated with the first exposure and the second exposure; determining, based on the saturation value, a threshold intensity; determining that a measured intensity of the intensity pixel is greater than or equal to the threshold intensity; and generating filtered data comprising a portion of the first intensity information, the filtered data including, based on the measured intensity being greater than the threshold intensity, at least one of the measured intensity for the intensity pixel or a measured depth of a depth pixel corresponding to the intensity pixel.

B: The vehicle of example A, the acts further comprising: determining that a second measured intensity of a second intensity pixel in the first intensity information is equal to or less than the threshold intensity, wherein the filtered data excludes information associated with the second intensity pixel based at least in part on the second measured intensity being equal to or less than the threshold intensity.

C: The vehicle of example A or example B, the acts further comprising: determining, based at least in part on the filtered data, an object in an environment of the vehicle; and controlling the vehicle relative to the object.

D: The vehicle of any one of example A through example C, wherein the saturation value is based at least in part on one or more of a number of high energy pixels of the first sensor data, a number of high energy pixels of the second sensor data, or a number of medium energy pixels of the first sensor data.

E: The vehicle of any one of example A through example D, wherein the first exposure time is from about four-times to about eight-times the length of the second exposure time.

F: An example system includes: a time-of-flight sensor configured to generate data based on light received at a receiver of the time-of-flight sensor; one or more processors; and memory storing processor-executable instructions that, when executed by the one or more processors, configure the vehicle to perform actions comprising: receiving first sensor data from the time-of-flight sensor, the first sensor data corresponding to a first exposure having a first exposure time; receiving second sensor data from the time-of-flight sensor, the second sensor data corresponding to a second exposure having a second exposure time shorter than the first exposure time; determining, based at least in part on the first sensor data and the second sensor data, a saturation value associated with the first exposure and the second exposure; determining, based at least in part on the saturation value, a threshold intensity; generating filtered data based on a measured intensity of an intensity pixel in the first sensor data and the threshold intensity, the filtered data comprising at least one of the measured intensity for the intensity pixel or a measured depth of a depth pixel corresponding to the intensity pixel.

G: The system of example F, wherein: the first sensor data comprises phase frames associated with reflected light received at the receiver during the first exposure time, the phase frames comprising phase values for a plurality of pixels of the receiver, the actions further comprising: determining, based at least in part on the phase values, unreliable pixels of the plurality of pixels; and determining, based at least in part on intensity information associated with the first sensor data, first measured intensities for the unreliable pixels, wherein the saturation value is based at least in part on a number of the unreliable pixels and the first measured intensities.

H: The system of example F or example G, wherein determining the unreliable pixels comprises determining that at least one of a sum of the phase values associated with the pixel or a sum of second phase values from the second sensor data and associated with the pixel equals other than substantially zero.

I: The system of any one of example F through example H, wherein: the second sensor data comprises second intensity information for the plurality of pixels; and the saturation value is further based at least in part on the second intensity information.

J: The system of any one of example F through example I, wherein the saturation value is based at least in part on a linear combination of first intensity values associated with the first exposure and second intensity values associated with the second exposure.

K: The system of any one of example F through example J, the actions further comprising: determining, based at least in part on one or more of the plurality of intensity pixels, an energy value associated with the primary image, wherein the determining the threshold intensity is based at least in part on the energy value being equal to or greater than a threshold energy value.

L: The system of any one of example F through example K, wherein the threshold intensity comprises a first threshold intensity, the actions further comprising: determining, based at least in part on the energy value being below the threshold energy value, a second threshold intensity.

M: The system of any one of example F through example L, wherein the second threshold intensity comprises an average intensity of a plurality of intensity pixels comprising the first sensor data.

N: The system of any one of example F through example M, wherein the time-of-flight sensor is associated with a vehicle, the actions further comprising: determining, based at least in part on the filtered data, an object represented in the first sensor data; and controlling the vehicle based at least in part on the object.

O: An example method includes: receiving first sensor data from a time-of-flight sensor, the first sensor data corresponding to a first exposure having a first exposure time; receiving second sensor data from the time-of-flight sensor, the second sensor data corresponding to a second exposure having a second exposure time shorter than the first exposure time; determining, based at least in part on the first sensor data and the second sensor data, a saturation value associated with the first exposure and the second exposure; determining, based at least in part on the saturation value, a threshold intensity; and generating filtered data based on a measured intensity of an intensity pixel in the first sensor data and the threshold intensity, the filtered data comprising at least one of the measured intensity for the intensity pixel or a measured depth of a depth pixel corresponding to the intensity pixel.

P: The method of example O, further comprising: determining, based at least in part on at least one of first phase values associated with the first sensor data or second phase values associated with the second sensor data, unreliable pixels of the plurality of pixels; and determining, based at least in part on intensity information associated with the first sensor data, measured intensities for the unreliable pixels, wherein the saturation value is based at least in part on a number of the unreliable pixels and the measured intensities.

Q: The method of example O or example P, wherein determining the unreliable pixels comprises determining that at least one of a sum of the first phase values equals other than substantially zero or a sum of the second phase values equals other than substantially zero.

R: The method of any one of example O through example Q, wherein: the second sensor data comprises second intensity information for the plurality of pixels; and the saturation value is further based at least in part on the second intensity information.

S: The method of any one of example O through example R, wherein the threshold intensity is determined based at least in part on an average energy of the first sensor data.

T: The method of any one of example O through example S, wherein the first exposure time is from about four-times to about eight-times the length of the second exposure time.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

We claim:
1. A vehicle comprising:
a time-of-flight sensor configured to generate data based on light received at a receiver of the time-of-flight sensor;
one or more processors; and
memory storing processor-executable instructions that, when executed by the one or more processors, configure the vehicle to perform acts comprising:
receiving, from the time-of-flight sensor, first sensor data comprising a plurality of first phase frames, the first phase frames comprising first phase values for pixels of the receiver, and the first sensor data being associated with a first exposure time;

receiving, from the time-of-flight sensor, second sensor data comprising a plurality of second phase frames, the second phase frames comprising second phase values for the pixels of the receiver, and the second sensor data being associated with a second exposure time shorter than the first exposure time;

determining, based at least in part on the first sensor data and the second sensor data, a plurality of unreliable pixels of the pixels, the plurality of unreliable pixels being a subset of the pixels;

determining a number of the unreliable pixels in the plurality of unreliable pixels;

determining first intensity information from the first phase values and second intensity information from the second phase values, the first intensity information comprising an intensity pixel;

determining, based at least in part on the number of unreliable pixels, the first intensity information, and the second intensity information, a saturation value associated with the first exposure and the second exposure;

determining, based on the saturation value, a threshold intensity;

determining that a measured intensity of the intensity pixel is greater than or equal to the threshold intensity; and generating filtered data comprising a portion of the first intensity information, the filtered data including, based on the measured intensity being greater than the threshold intensity, at least one of the measured intensity for the intensity pixel or a measured depth of a depth pixel corresponding to the intensity pixel.

2. The vehicle of claim 1, the acts further comprising:
determining that a second measured intensity of a second intensity pixel in the first intensity information is equal to or less than the threshold intensity,
wherein the filtered data excludes information associated with the second intensity pixel based at least in part on the second measured intensity being equal to or less than the threshold intensity.

3. The vehicle of claim 1, the acts further comprising:
determining, based at least in part on the filtered data, an object in an environment of the vehicle; and
controlling the vehicle relative to the object.

4. The vehicle of claim 1, wherein the saturation value is based at least in part on one or more of a number of high energy pixels of the first sensor data, a number of high energy pixels of the second sensor data, or a number of medium energy pixels of the first sensor data.

5. The vehicle of claim 1, wherein the first exposure time is from about four-times to about eight-times the length of the second exposure time.

6. A system comprising:
a time-of-flight sensor configured to generate data based on light received at a receiver of the time-of-flight sensor;
one or more processors; and
memory storing processor-executable instructions that, when executed by the one or more processors, configure the vehicle to perform actions comprising:
receiving first sensor data from the time-of-flight sensor, the first sensor data corresponding to a first exposure having a first exposure time;
receiving second sensor data from the time-of-flight sensor, the second sensor data corresponding to a second exposure having a second exposure time shorter than the first exposure time;

determining, based at least in part on the first sensor data and the second sensor data, unreliable pixels of pixels associated with a receiver of the time-of-flight sensor;

determining a number of the unreliable pixels;

determining, based at least in part on the number of the unreliable pixels, a saturation value associated with the first exposure and the second exposure;

determining, based at least in part on the saturation value, a threshold intensity;

generating filtered data based on a measured intensity of an intensity pixel in the first sensor data and the threshold intensity, the filtered data comprising at least one of the measured intensity for the intensity pixel or a measured depth of a depth pixel corresponding to the intensity pixel.

7. The system of claim 6, wherein:
the first sensor data comprises phase frames associated with reflected light received at the receiver during the first exposure time, the phase frames comprising phase values for a plurality of pixels of the receiver, the actions further comprising:
determining, based at least in part on the phase values, the unreliable pixels as a subset of the plurality of pixels; and
determining, based at least in part on intensity information associated with the first sensor data, first measured intensities for the unreliable pixels,
wherein the saturation value is based at least in part on the quantity of the unreliable pixels and the first measured intensities.

8. The system of claim 7, wherein determining the unreliable pixels comprises determining that at least one of a sum of the phase values associated with the pixel or a sum of second phase values from the second sensor data and associated with the pixel equals other than substantially zero.

9. The system of claim 7, wherein:
the second sensor data comprises second intensity information for the plurality of pixels; and
the saturation value is further based at least in part on the second intensity information.

10. The system of claim 9, wherein the saturation value is based at least in part on a linear combination of first intensity values associated with the first exposure and second intensity values associated with the second exposure.

11. The system of claim 6, the actions further comprising:
determining, based at least in part on one or more of the plurality of intensity pixels, an energy value associated with a primary image,
wherein the determining the threshold intensity is based at least in part on the energy value being equal to or greater than a threshold energy value.

12. The system of claim 11, wherein the threshold intensity comprises a first threshold intensity, the actions further comprising:
determining, based at least in part on the energy value being below the threshold energy value, a second threshold intensity.

13. The system of claim 12, wherein the second threshold intensity comprises an average intensity of a plurality of intensity pixels comprising the first sensor data.

14. The system of claim 6, wherein the time-of-flight sensor is associated with a vehicle, the actions further comprising:

determining, based at least in part on the filtered data, an object represented in the first sensor data; and controlling the vehicle based at least in part on the object.

15. A method comprising:

receiving first sensor data from a time-of-flight sensor, the first sensor data corresponding to a first exposure having a first exposure time;

receiving second sensor data from the time-of-flight sensor, the second sensor data corresponding to a second exposure having a second exposure time shorter than the first exposure time;

determining, based at least in part on the first sensor data and the second sensor data, unreliable pixels of pixels associated with a receiver of the time-of-flight sensor;

determining a number of the unreliable pixels;

determining, based at least in part on the number of the unreliable pixels, a saturation value associated with the first exposure and the second exposure;

determining, based at least in part on the saturation value, a threshold intensity; and generating filtered data based on a measured intensity of an intensity pixel in the first sensor data and the threshold intensity, the filtered data comprising at least one of the measured intensity for the intensity pixel or a measured depth of a depth pixel corresponding to the intensity pixel.

16. The method of claim 15, further comprising:

determining, based at least in part on at least one of first phase values associated with the first sensor data or second phase values associated with the second sensor data, the unreliable pixels as a subset of the plurality of pixels; and determining, based at least in part on intensity information associated with the first sensor data, measured intensities for the unreliable pixels, wherein the saturation value is based at least in part on a number of the unreliable pixels and the measured intensities.

17. The method of claim 16, wherein determining the unreliable pixels comprises determining that at least one of a sum of the first phase values equals other than substantially zero or a sum of the second phase values equals other than substantially zero.

18. The method of claim 16, wherein:

the second sensor data comprises second intensity information for the plurality of pixels; and the saturation value is further based at least in part on the second intensity information.

19. The method of claim 15, wherein the threshold intensity is determined based at least in part on an average energy of the first sensor data.

20. The method of claim 15, wherein the first exposure time is from about four-times to about eight-times the length of the second exposure time.

* * * * *